United States Patent
Daher et al.

(10) Patent No.: US 11,140,882 B2
(45) Date of Patent: Oct. 12, 2021

(54) TANK SYSTEM AND METHOD

(71) Applicant: Iwaki America Incorporated, Holliston, MA (US)

(72) Inventors: Jean Daher, Auburn, MA (US); Nobutoshi Sato, Saitama (JP); Christopher Collins, Mendon, MA (US); William Lane Peacock, Amesbury, MA (US); Eric Moore, Pomfret Center, CT (US); John Peter Miersma, Whitinsville, MA (US)

(73) Assignee: IWAKI AMERICA INCORPORATED, Holliston, MA (US)

( * ) Notice: Subject to any disclaimer, the term of this patent is extended or adjusted under 35 U.S.C. 154(b) by 477 days.

(21) Appl. No.: 15/992,897

(22) Filed: May 30, 2018

(65) Prior Publication Data
US 2019/0364855 A1    Dec. 5, 2019

(51) Int. Cl.
*A01K 63/04* (2006.01)
*A01K 61/10* (2017.01)
(Continued)

(52) U.S. Cl.
CPC ............ *A01K 63/045* (2013.01); *A01K 61/10* (2017.01); *B65D 25/24* (2013.01); *B65D 43/165* (2013.01)

(58) Field of Classification Search
CPC ...... A01K 64/045; A01K 61/10; A01K 63/04; A01K 63/02; B65D 43/165
See application file for complete search history.

(56) References Cited

U.S. PATENT DOCUMENTS 3,288,110 A * 11/1966 Goldman ............ A01K 63/006
                                                            119/248
3,304,645 A *  2/1967 Hardesty ................ A01K 97/05
                                                            43/55
(Continued)

FOREIGN PATENT DOCUMENTS

CA    2551710 A1 *  1/2007    ............. A01K 63/00
EP    1624747 B1     8/2008

OTHER PUBLICATIONS

International Search Report and Written Opinion for International Application No. PCT/US2019/033827, dated Sep. 4, 2019, 9 pages.

*Primary Examiner* — Magdalena Topolski
*Assistant Examiner* — Katelyn T Truong
(74) *Attorney, Agent, or Firm* — Greenberg Traurig, LLP

(57) ABSTRACT

Embodiments of the invention provide a tank assembly with a main housing enclosing an inner volume, and an outlet section positioned extending from one end of the main housing that includes a front cavity with an outlet volume and an adjacent outlet channel. Some embodiments include at least one removable filter configured to be inserted at least partially into main housing forming at least a filtered volume and a fluidly coupled main volume. Some embodiments include a removable tank baffle including at least one central channel and a plurality of baffle apertures. In some embodiments, the central channel is configured to be fluidly coupled to the outlet channel when the removable tank baffle is positioned in the main housing. Further, the plurality of baffle apertures are configured to be fluidly coupled to the outlet volume when the removable tank baffle is positioned in the main housing.

19 Claims, 24 Drawing Sheets

(51) Int. Cl.
*B65D 43/16* (2006.01)
*B65D 25/24* (2006.01)

(56) References Cited

U.S. PATENT DOCUMENTS

| | | | | |
|---|---|---|---|---|
| 3,512,503 | A * | 5/1970 | Willinger | A01K 63/003 |
| | | | | 119/251 |
| 5,050,526 | A * | 9/1991 | Nelson | A01K 63/02 |
| | | | | 114/364 |
| 5,140,855 | A * | 8/1992 | Gruber | C02F 3/327 |
| | | | | 73/432.1 |
| 5,499,473 | A * | 3/1996 | Ramberg | A01K 97/05 |
| | | | | 43/55 |
| 5,728,293 | A * | 3/1998 | Guoli | A01K 63/045 |
| | | | | 210/151 |
| 5,888,388 | A | 3/1999 | Kirk | |
| 6,588,371 | B2 * | 7/2003 | Hallock | A01K 1/031 |
| | | | | 119/248 |
| 7,503,283 | B2 * | 3/2009 | Abraham | A01K 63/003 |
| | | | | 119/217 |
| 7,810,452 | B2 | 10/2010 | Pieretto et al. | |
| 7,927,483 | B2 | 4/2011 | Huehn | |
| 9,226,475 | B2 | 1/2016 | Castranova | |
| 2008/0173249 | A1 * | 7/2008 | Miller | A01K 63/04 |
| | | | | 119/228 |

* cited by examiner

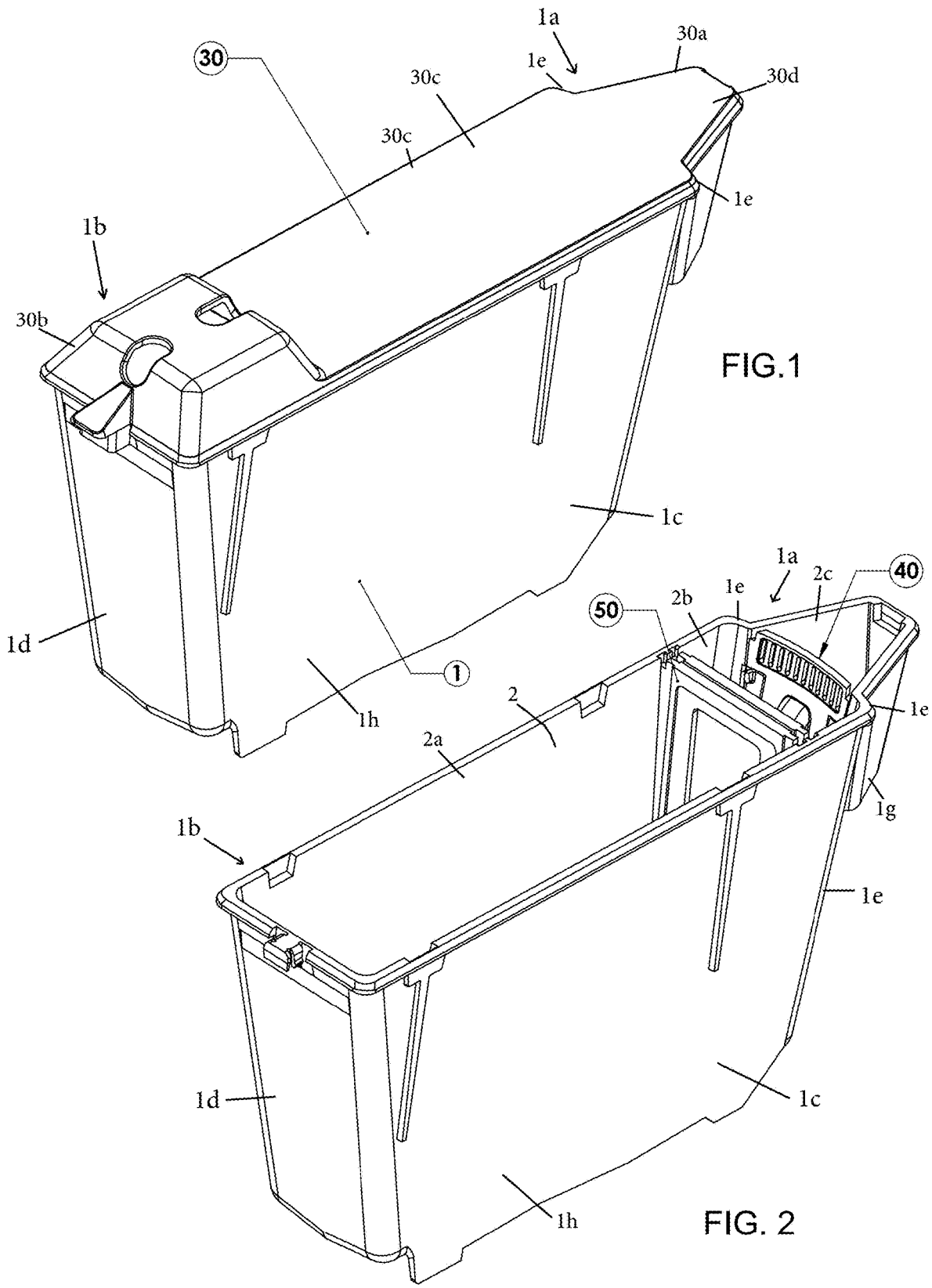

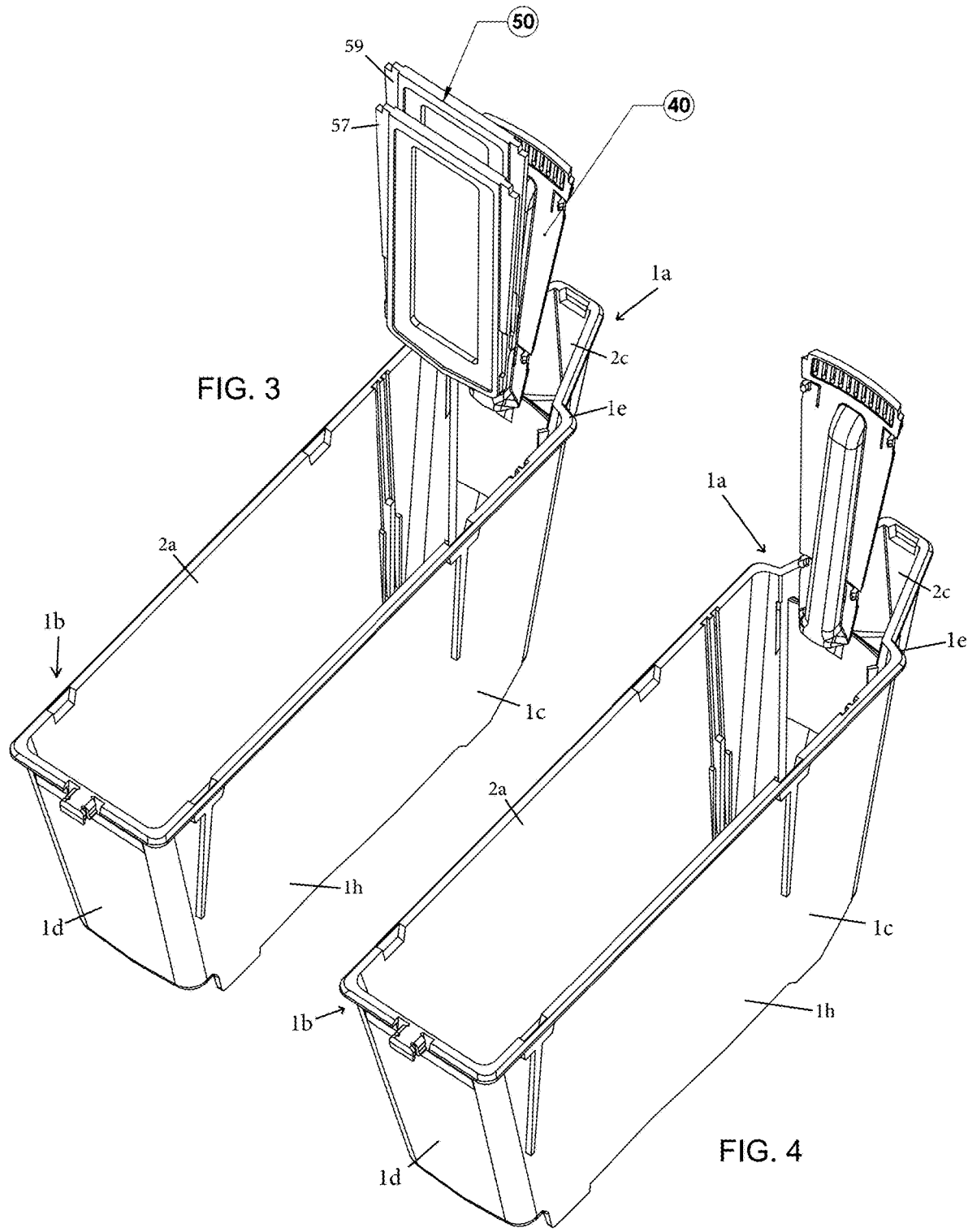

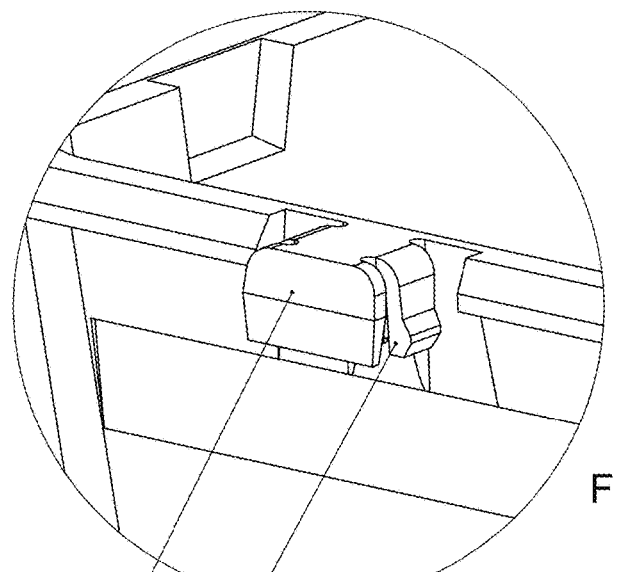
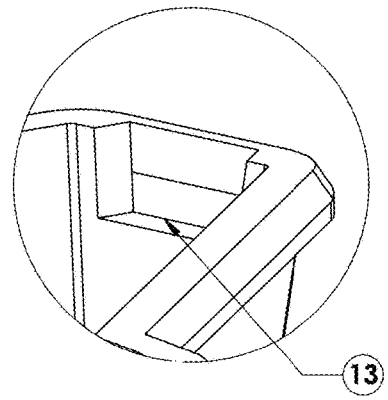
FIG. 6B
FIG. 6C
FIG. 6A
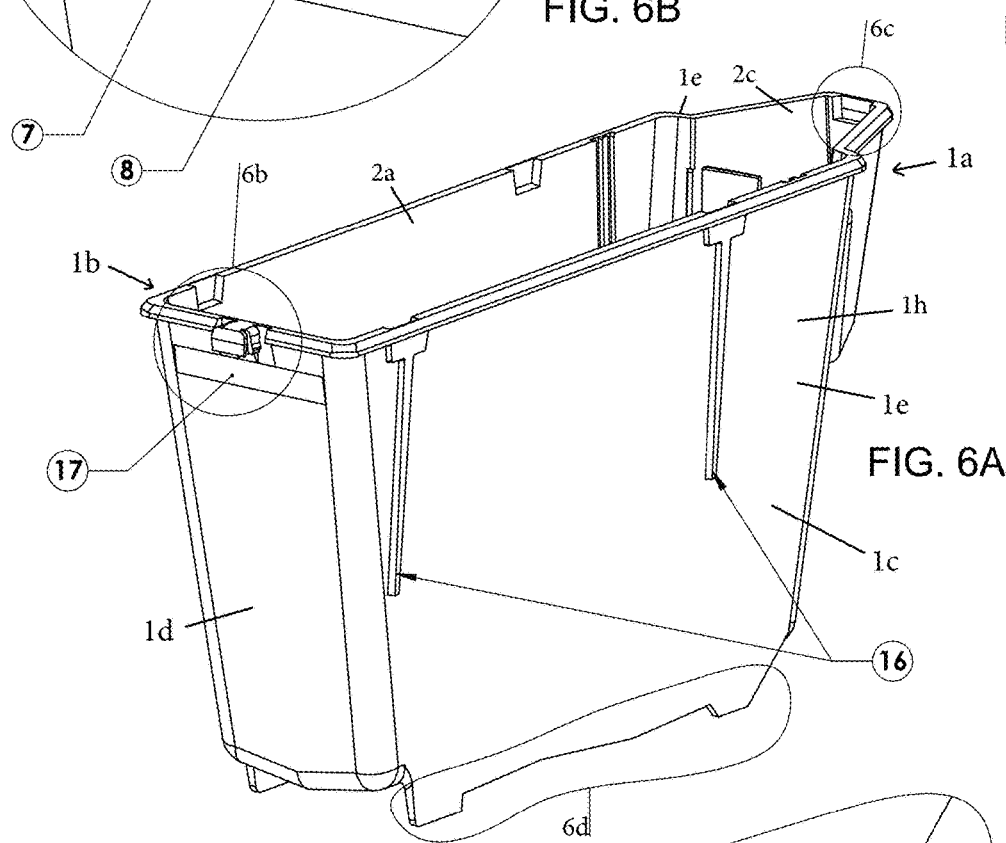
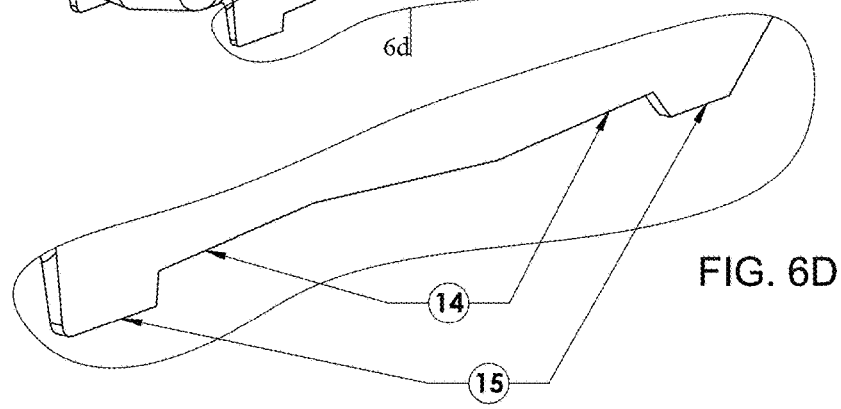
FIG. 6D

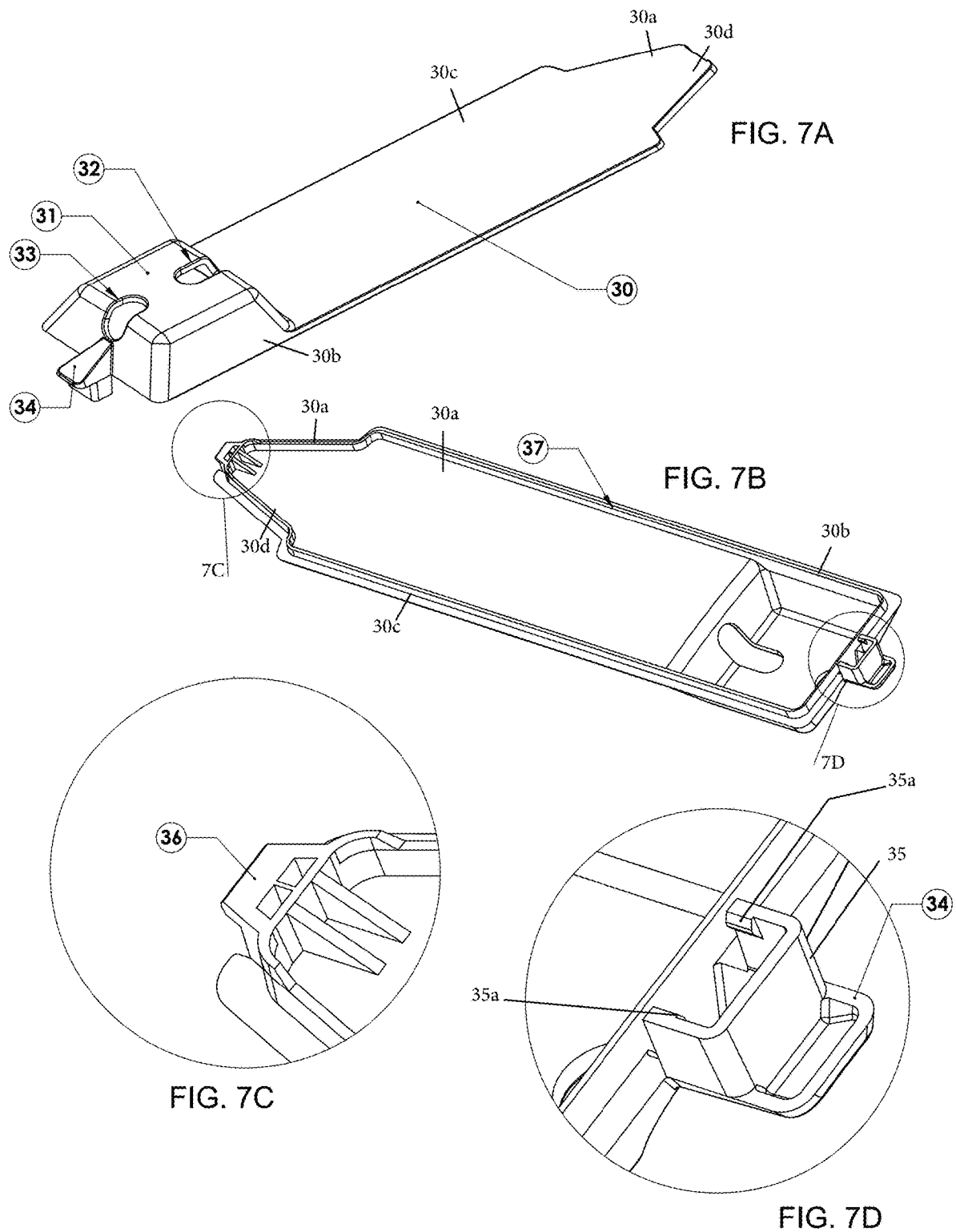

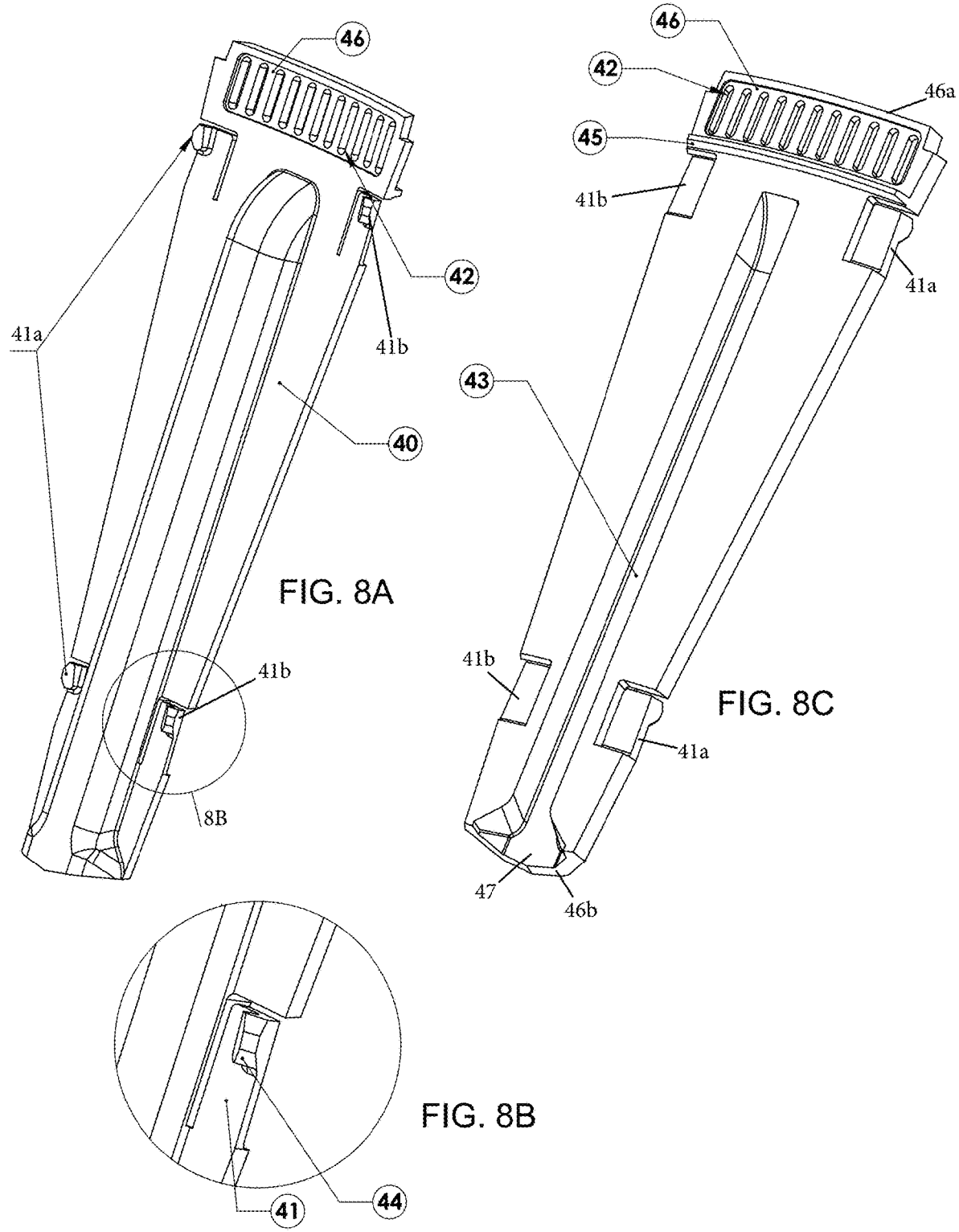

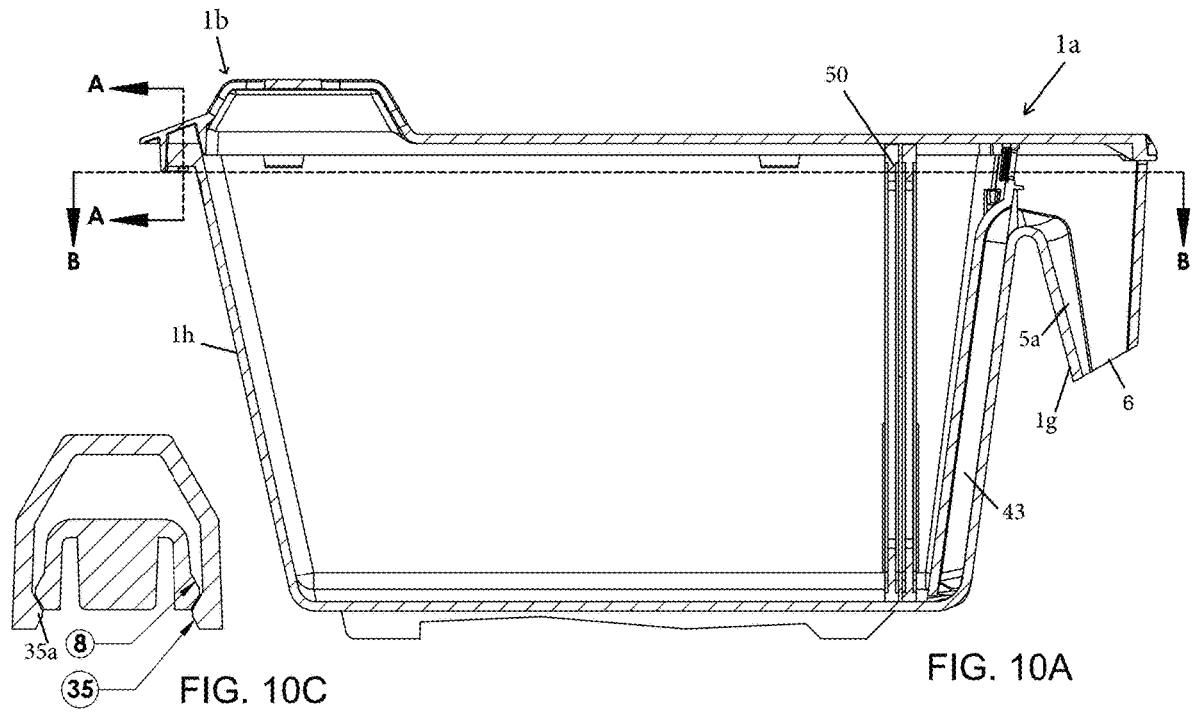
FIG. 10C
FIG. 10A
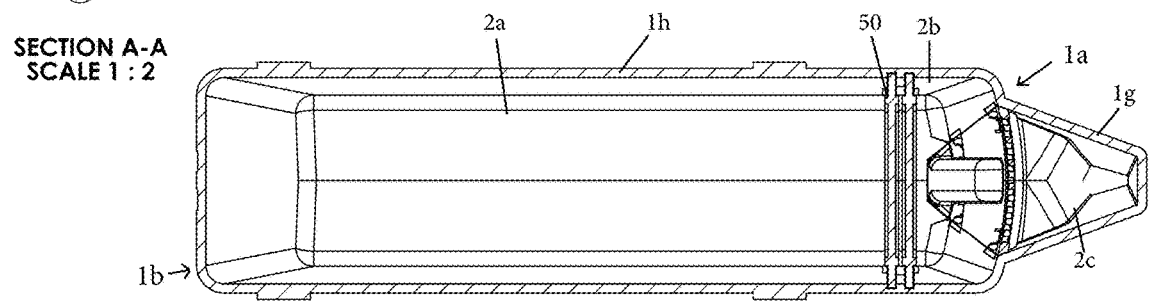
SECTION A-A
SCALE 1 : 2
SECTION B-B
SCALE 1 : 2
FIG. 10B

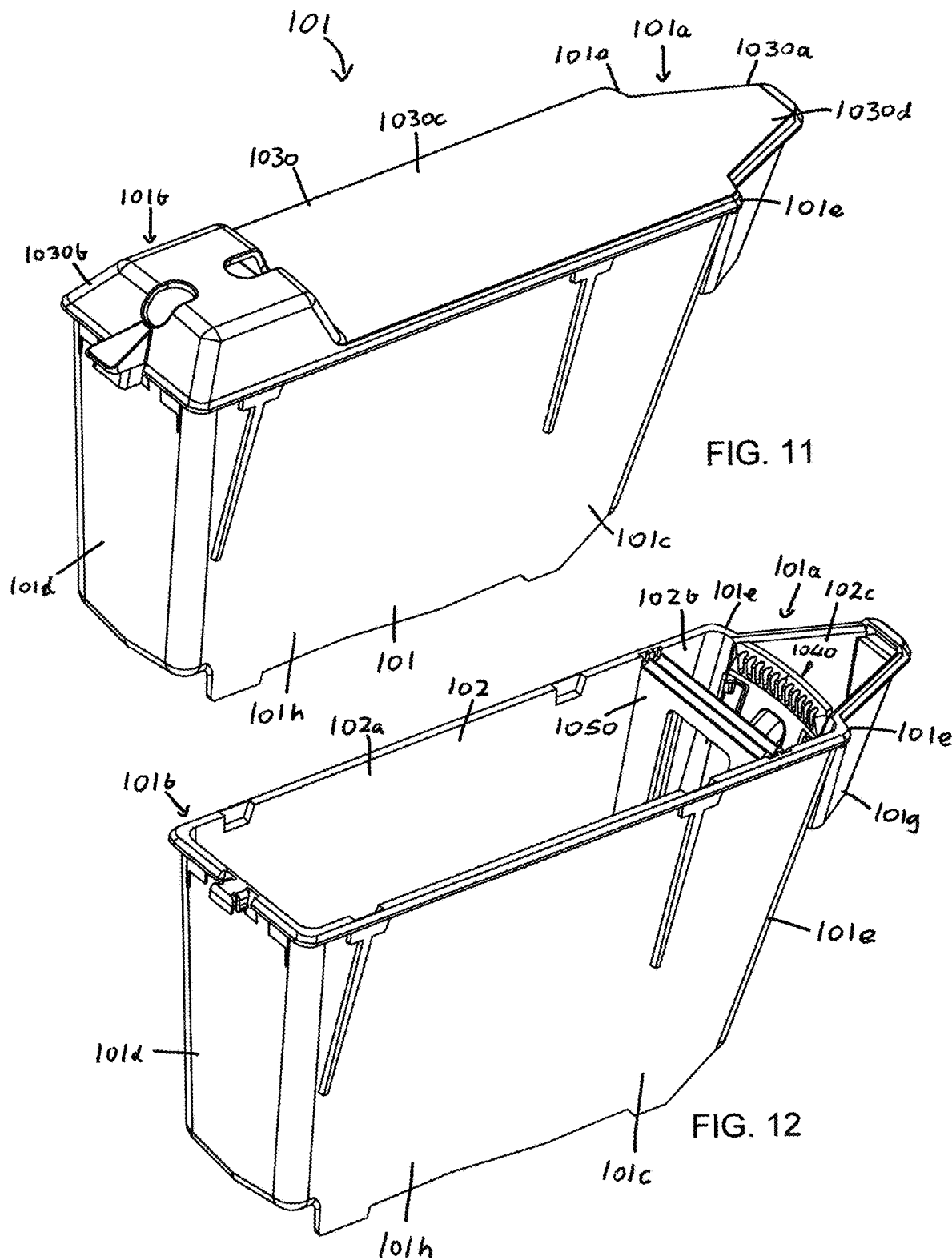

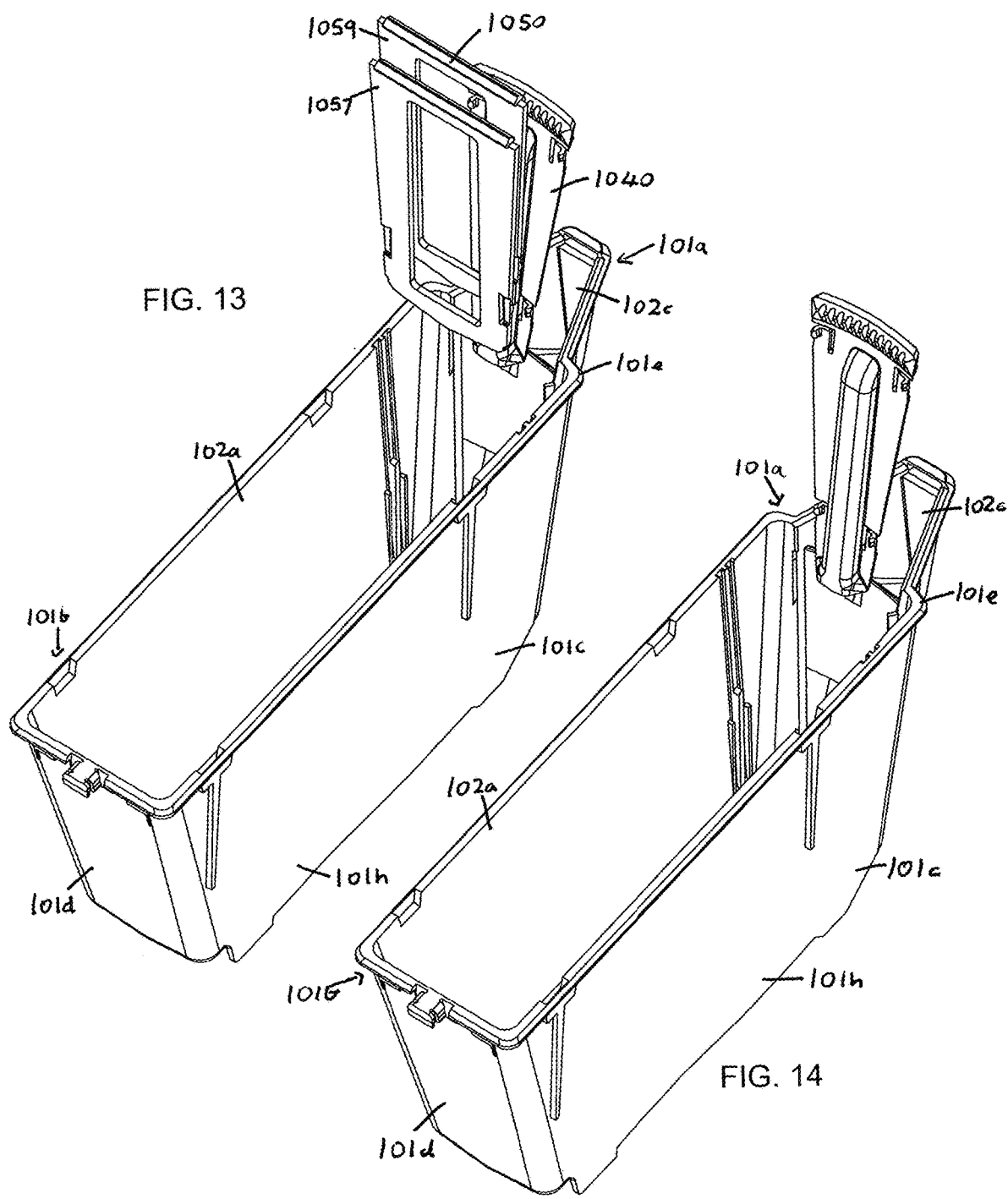

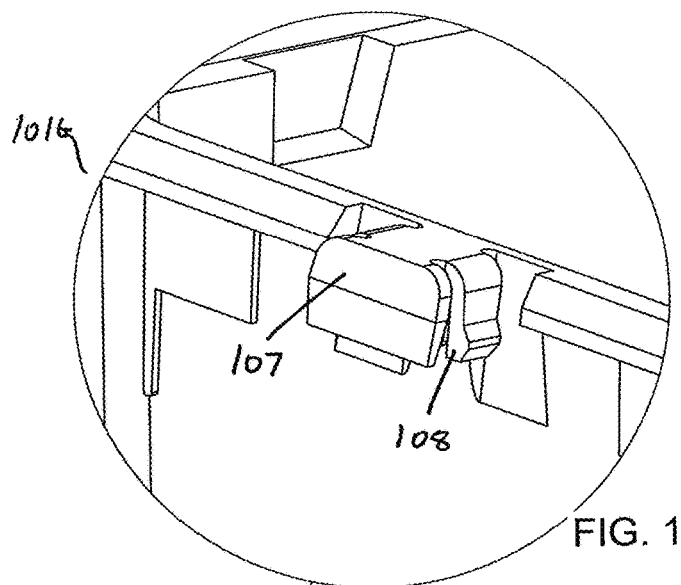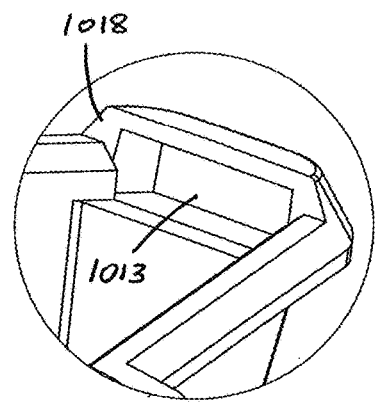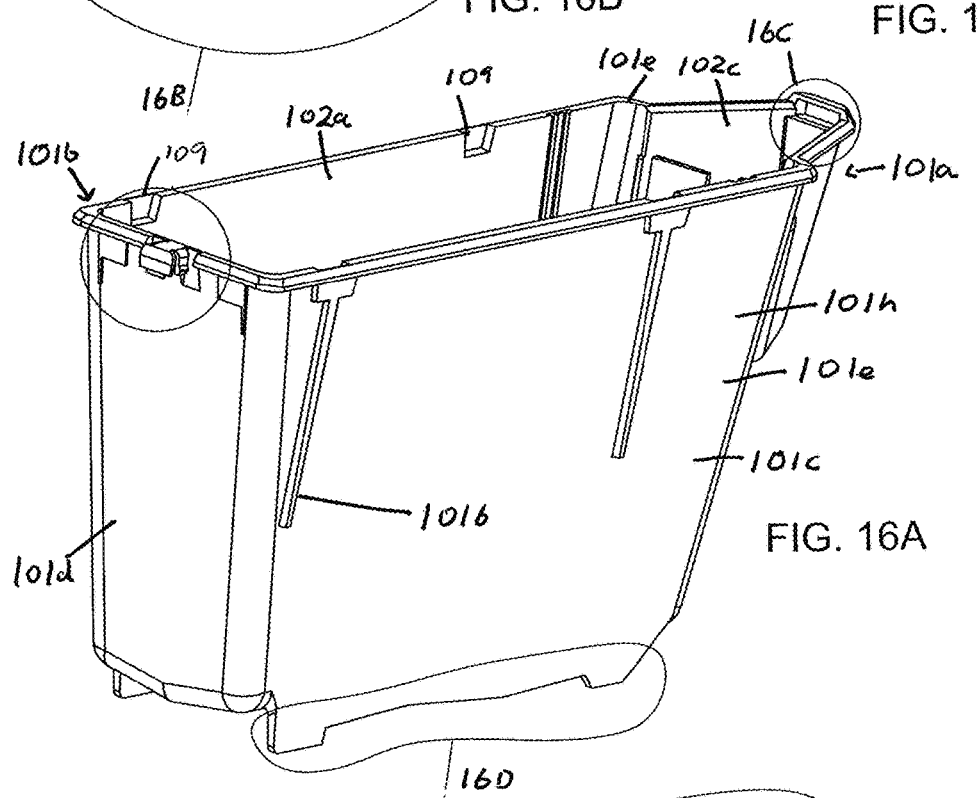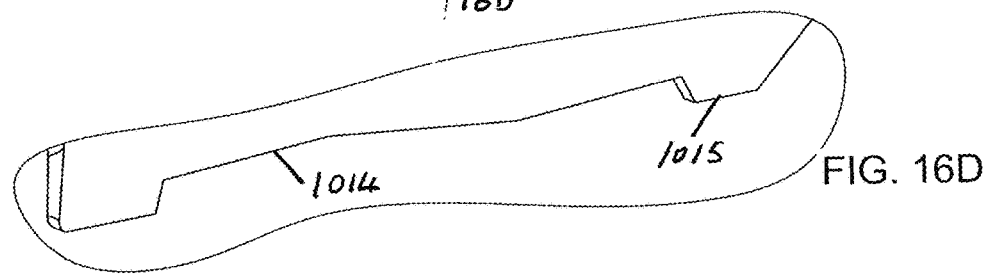
FIG. 16B
FIG. 16C
FIG. 16A
FIG. 16D

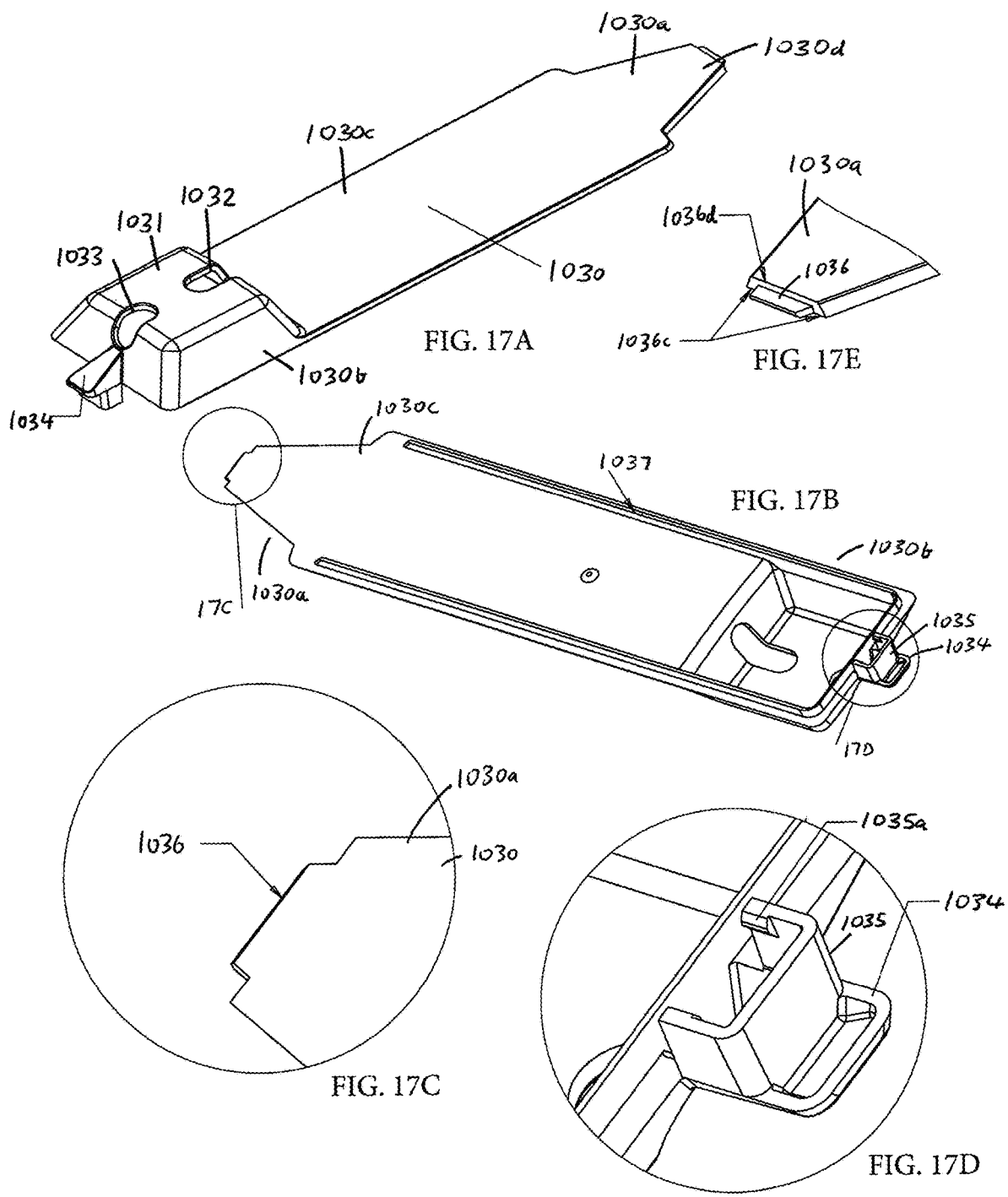

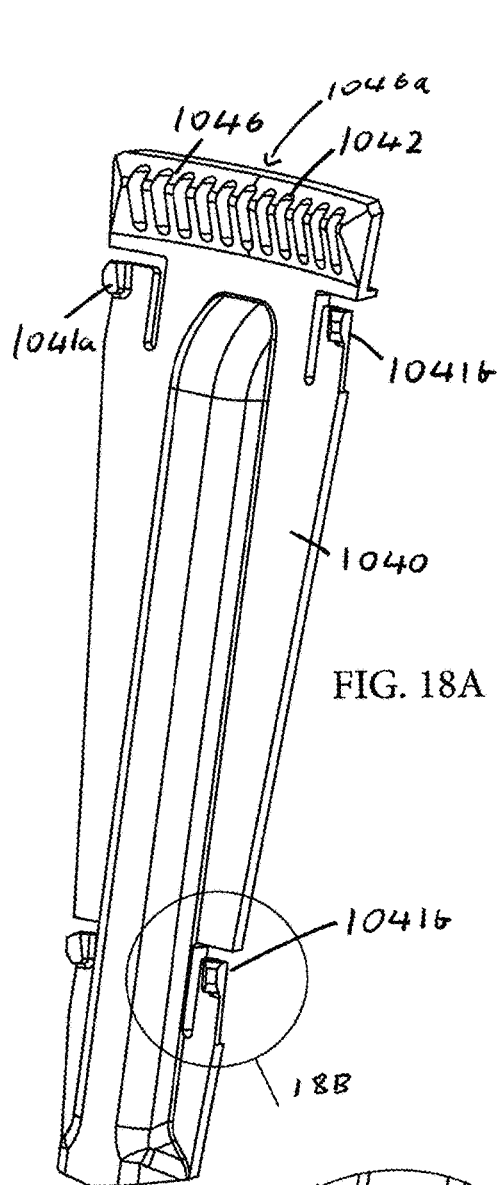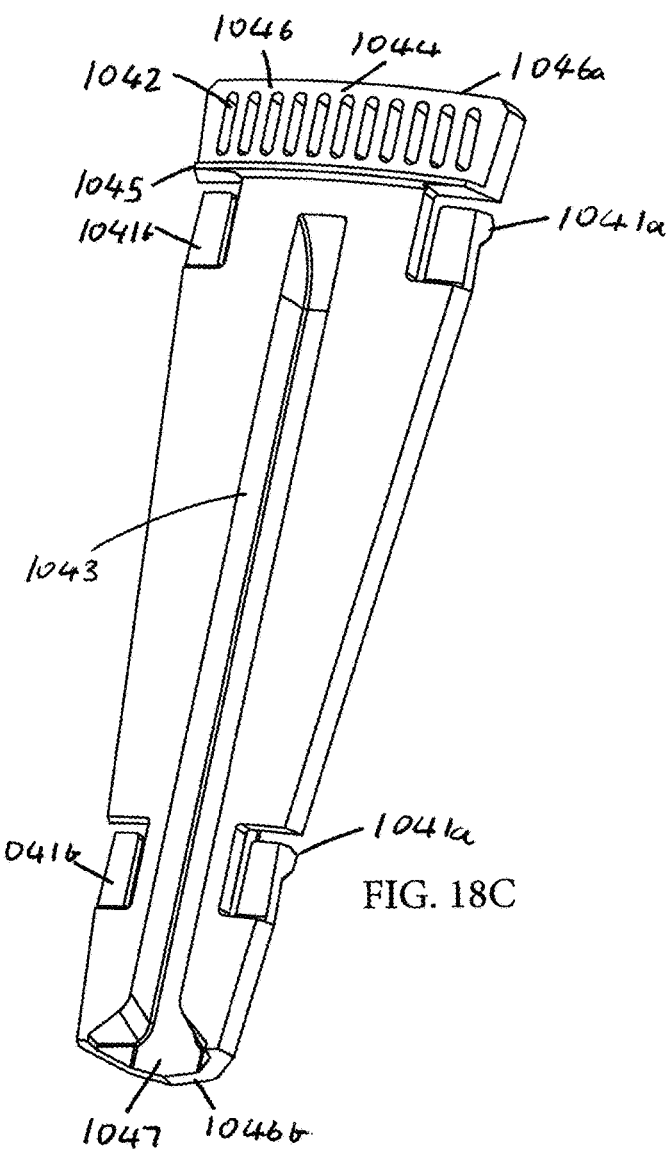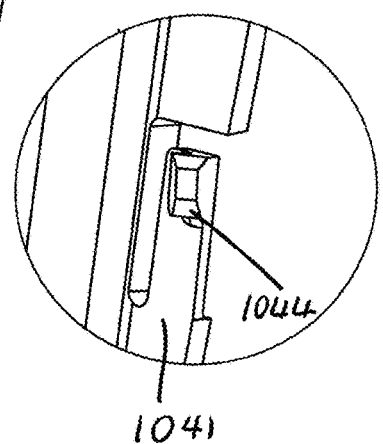
FIG. 18A
FIG. 18C
FIG. 18B

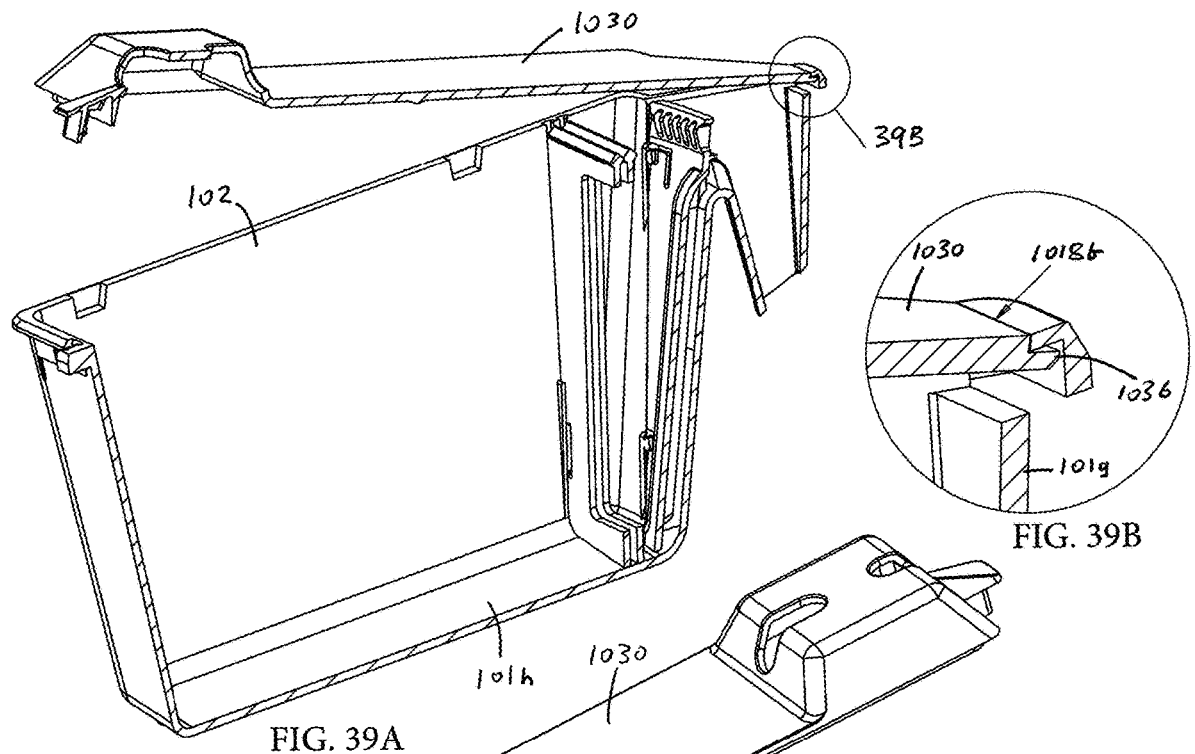
FIG. 39A
FIG. 39B
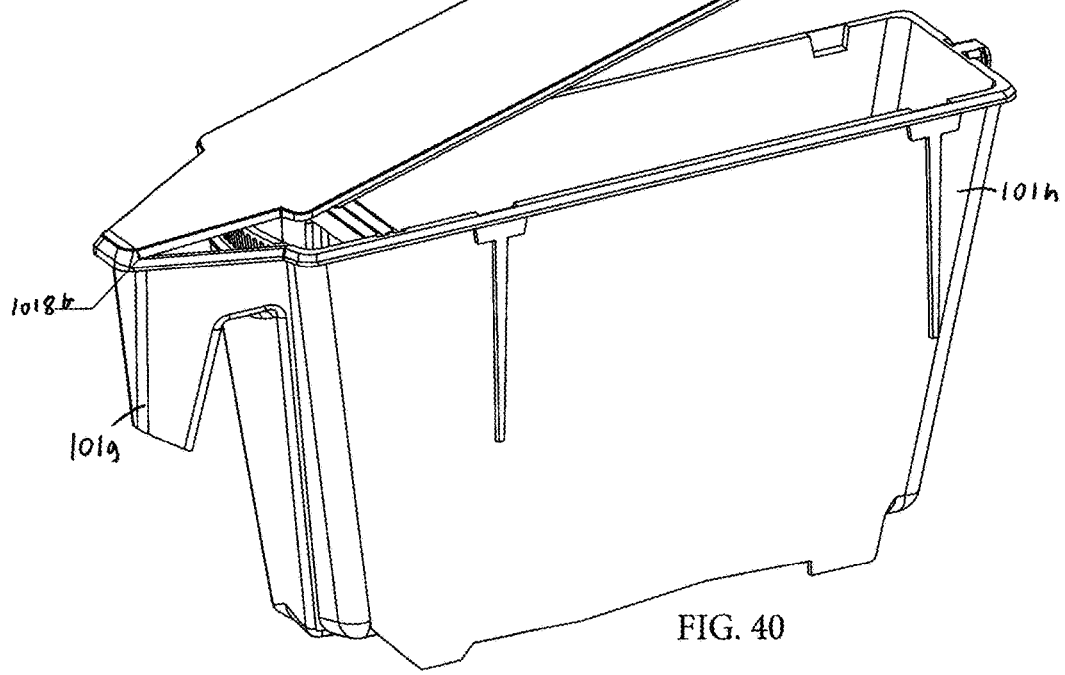
FIG. 40

TANK SYSTEM AND METHOD

BACKGROUND

Aquatic animals such as fish are often housed and bred on a large scale using aquatic system tanks that maintain a suitable aquatic environment for feeding and natural and/or selective breeding. Some system tanks can include one or more inlets and outlets for water flow and exchange. Some system tanks often include one or more dividers to separate genetic strains or male/female animals, and some system tanks include baskets or nets to raise fish fry or juveniles until their swim bladder is inflated. Conventional breeding practices are often accomplished using a breeding tank, and can include an inner basket to keep adults from eating their own eggs, and a divider to separate male and female. Breeding tanks are usually separate tanks that are set up on the bench or in a cart and their purpose is solely to breed fish.

Recently, many researchers have noticed that the fish breed better when the breeding tank is fluidly coupled to the system tank, and on occasion, certain researchers will nest an inner perforated tank or basket within a system tank. However, the use of separate tanks and/or tank inserts can add complexity and cost, including equipment cost and labor cost. The ability to use a single tank with optionally positioned filters and other sections can reduce this complexity, and lower overall setup and operational expenses.

SUMMARY

Some embodiments include a tank assembly comprising a main housing enclosing an inner volume, and an outlet section positioned extending from one end of the main housing, the outlet section including a front cavity comprising an outlet volume and an adjacent outlet channel. Some embodiments include a removable tank baffle including at least one channel and a plurality of baffle apertures, where the at least one channel is configured to be fluidly coupled to the outlet channel when the removable tank baffle is positioned in the main housing. Further, in some embodiments, the plurality of baffle apertures are configured to be fluidly coupled to the outlet volume when the removable tank baffle is positioned in the main housing.

Some embodiments further comprise a removable tank lid comprising a main body including a front end and a back end. In some embodiments, the tank lid comprises an outlet portion extending from the main body at the front end, and an upper housing extending from the main body at the back end. In some embodiments, tank lid includes a forward vent extending across a portion of the upper housing towards the front end. In some further embodiments, the tank lid includes a rearward vent extending across a portion of the upper housing towards the back end.

Some embodiments of the invention include a tank lid with a coupler at the back end that is configured and arranged to couple to a coupler located on an upper edge of a rear side wall of the main housing. In some further embodiments of the invention, the tank lid includes an inner skirt extending at least partially around the main body, where the inner skirt is at least partially within the inner volume when the tank lid is coupled to the main housing.

In some embodiments, the main housing includes at least one guide, and at least one removable filter that is configured to be inserted into the at least one guide. In some embodiments, the main housing includes one or more notches positioned at an inner end of a front side wall on one side. In some embodiments, the main housing includes one or more extensions positioned at the inner end of the front side wall on an opposite side, where the one or more notches, and the one or more extensions are configured to couple, secure, and/or at least partially retain the tank baffle.

In some embodiments of the invention, the outlet section comprises a front wall including a slot. In some embodiments, the slot is fluidly coupled to the outlet volume. In some embodiments, the at least one central channel is configured to fluidly couple to the outlet channel via the slot when the tank baffle is positioned in the main housing.

Some embodiments include a good comprising a tank housing enclosing an inner volume and including a front end comprising an outlet section including an outlet volume and outlet channel. Some embodiments of the good include at least one removable filter configured to be inserted at least partially into guides of the tank housing, and a tank baffle including a plurality of baffle apertures and at least one central channel, where the tank baffle is configured to be inserted into the tank housing.

In some embodiments, the at least one central channel is configured and arranged to be fluidly coupled to the outlet channel of the outlet section when the tank baffle is positioned in the tank housing. In some embodiments, the fluid coupling is achieved via a slot in a front wall of the outlet section. Some embodiments further comprise a tank lid comprising a main body including a front end and an outlet portion extending from the main body at the front end.

In some embodiments of the good, the tank lid includes an upper housing extending from the main body at a back end of the tank lid opposite the front end. In some embodiments, the tank baffle includes at least one tab on one side and an opposite side can include at least one receiver. In some embodiments, the tank housing includes one or more notches positioned at an inner end of a front side wall on one side and one or more extensions positioned at the inner end of the front side wall on an opposite side, where the one or more notches, and the one or more extensions are configured to couple, secure, and/or at least partially retain the tank baffle. In some further embodiments, when the tank baffle is at least partially positioned in the tank housing, the at least one of the tab can couple to or be positioned into at least one notche, and/or at least one extension of the tank housing can be positioned into at least one receiver of the tank baffle.

DESCRIPTION OF THE DRAWINGS

FIG. 1 illustrates a perspective view of a tank assembly in accordance with some embodiments of the invention.

FIG. 2 illustrates the tank assembly of FIG. 1 with tank lid removed in accordance with some embodiments of the invention.

FIG. 3 illustrates the tank assembly of FIG. 1 with tank lid removed and tank baffle and tank filters in a raised position in accordance with some embodiments of the invention.

FIG. 4 illustrates the tank assembly of FIG. 1 with tank lid and tank filters removed and tank baffle in a raised position in accordance with some embodiments of the invention.

FIG. 6A illustrates a side perspective view of the tank assembly of FIG. 1 with tank lid, tank baffle, and tank filters removed in accordance with some embodiments of the invention FIG. 6B illustrates a close-up view of an upper portion of the back end of the tank assembly of FIG. 1 in accordance with some embodiments of the invention.

FIG. 6C illustrates a close-up view of an upper portion of the front end of the tank assembly of FIG. 1 in accordance with some embodiments of the invention.

FIG. 6D illustrates a close-up view of a lower portion or base of the tank assembly of FIG. 1 in accordance with some embodiments of the invention.

FIG. 7A illustrates a tank lid of the tank assembly of FIG. 1 in accordance with some embodiments of the invention.

FIG. 7B illustrates an inner side view of the tank lid in accordance with some embodiments of the invention.

FIG. 7C illustrates a view of a portion of a front extension of the tank lid of the tank assembly of FIG. 1 in accordance with some embodiments of the invention.

FIG. 7D illustrates a view of a portion of the back end of the tank assembly of FIG. 1 in accordance with some embodiments of the invention.

FIG. 8A illustrates a close-up view of a baffle of the tank assembly of FIG. 1 in accordance with some embodiments of the invention.

FIG. 8B illustrates an outward-facing perspective view of a baffle of the tank assembly of FIG. 1 in accordance with some embodiments of the invention.

FIG. 8C illustrates an outward-facing perspective view of a baffle of the tank assembly of FIG. 1 in accordance with some embodiments of the invention.

FIG. 10A illustrates a side cross-sectional view of the tank assembly of FIG. 1 in accordance with some embodiments of the invention.

FIG. 10B illustrates a top cross-sectional view of the tank assembly of FIG. 1 in accordance with some embodiments of the invention.

FIG. 10C illustrates an end cross-sectional view of the section A-A of the tank assembly of FIG. 1 as shown in FIG. 10B in accordance with some embodiments of the invention.

FIG. 11 illustrates a perspective view of a tank assembly in accordance with some further embodiments of the invention.

FIG. 12 illustrates the tank assembly of FIG. 11 with tank lid removed in accordance with some further embodiments of the invention.

FIG. 13 illustrates the tank assembly of FIG. 11 with tank lid removed and tank baffle and tank filters in a raised position in accordance with some further embodiments of the invention.

FIG. 14 illustrates the tank assembly of FIG. 11 with tank lid and tank filters removed and tank baffle in a raised position in accordance with some further embodiments of the invention.

FIG. 16A illustrates a side perspective view of the tank assembly of FIG. 11 with tank lid, tank baffle, and tank filters removed in accordance with some further embodiments of the invention FIG. 16B illustrates a close-up view of an upper portion of the back end of the tank assembly of FIG. 11 in accordance with some further embodiments of the invention.

FIG. 16C illustrates a close-up view of an upper portion of the front end of the tank assembly of FIG. 11 in accordance with some further embodiments of the invention.

FIG. 16D illustrates a close-up view of a lower portion or base of the tank assembly of FIG. 11 in accordance with some further embodiments of the invention.

FIG. 17A illustrates a tank lid of the tank assembly of FIG. 11 in accordance with some further embodiments of the invention.

FIG. 17B illustrates an inner side view of the tank lid in accordance with some further embodiments of the invention.

FIG. 17C illustrates a view of a portion of a front extension of the tank lid of the tank assembly of FIG. 11 in accordance with some further embodiments of the invention.

FIG. 17D illustrates a view of a portion of the back end of the tank assembly of FIG. 11 in accordance with some further embodiments of the invention.

FIG. 17E illustrates close-up of a tank lid in accordance with some further embodiments of the invention.

FIG. 18A illustrates a close-up view of a baffle of the tank assembly of FIG. 11 in accordance with some further embodiments of the invention.

FIG. 18B illustrates an outward-facing perspective view of a baffle of the tank assembly of FIG. 11 in accordance with some further embodiments of the invention.

FIG. 18C illustrates an outward-facing perspective view of a baffle of the tank assembly of FIG. 11 in accordance with some further embodiments of the invention.

FIG. 39A illustrates a cross-sectional view of a portion of a tank assembly in accordance with some further embodiments of the invention.

FIG. 39B illustrates a cross-sectional view of a portion of a tank assembly in accordance with some further embodiments of the invention.

FIG. 40 illustrates a perspective view of a tank assembly including a raised lid in accordance with some further embodiments of the invention.

DETAILED DESCRIPTION

Figure 5A:
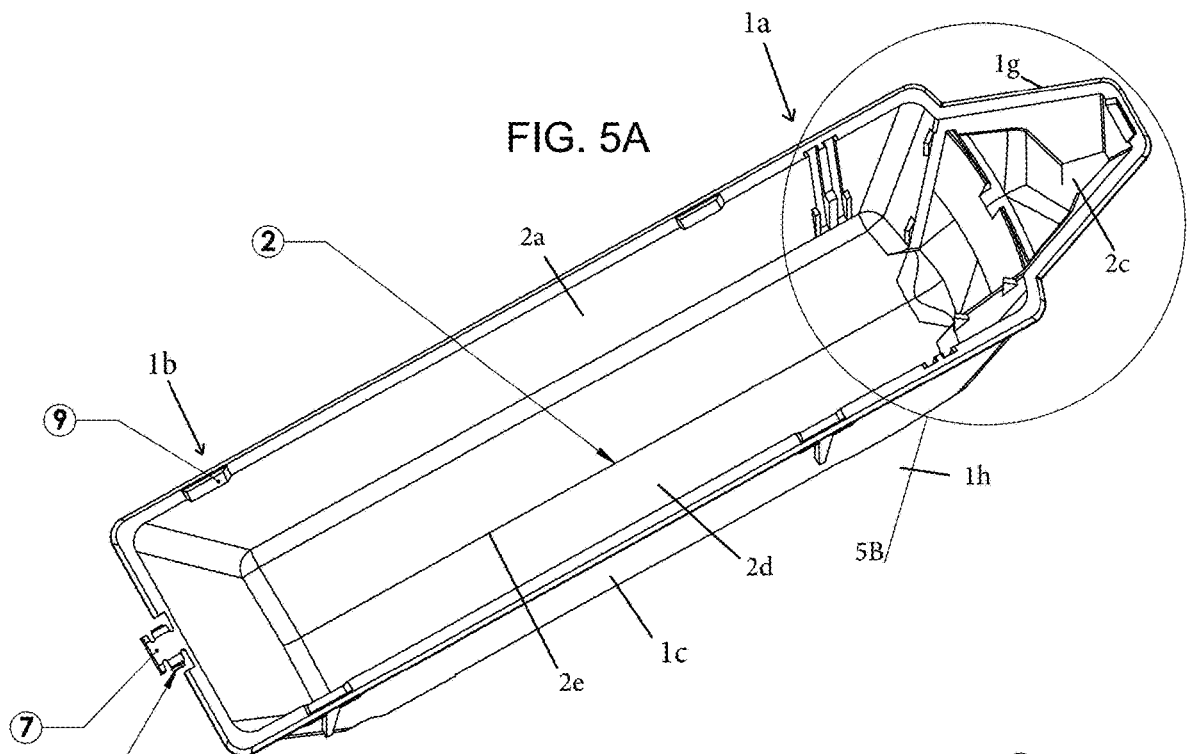
FIG. 5A illustrates the tank assembly of FIG. 1 with tank lid, tank baffle, and tank filters removed in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a perspective view of a tank assembly 1 in accordance with some embodiments of the invention. Some embodiments of the invention include a tank assembly 1 comprising a tank lid 30 coupled to a tank housing 1h. As illustrated, in some embodiments, the tank housing 1h can comprise a front end 1a and a back end 1b, with side walls 1c extending on each side from a rear side wall 1d to a front side wall 1e. In some embodiments, the tank lid 30 can comprise a main body 30c extending from a front end 30a to back end 30b, with outlet portion 30d extending from the main body 30c at the front end 30a.

Some further illustrations include some views or partial views of components or portions of the tank assembly 1 that allow visualization of the external and internal components and portions of the tank assembly 1. For example, FIG. 2 illustrates the tank assembly 1 of FIG. 1 with tank lid 30 removed in accordance with some embodiments of the invention. This illustration reveals various internal spaces and components of the tank assembly 1. For example, in some embodiments of the invention, the tank assembly 1 can include one or more tank filters 50 that can be positioned in the tank housing 10 towards the front end 1a. For example, FIG. 3 illustrates the tank assembly 1 of FIG. 1 with tank lid 30 removed, and with a tank baffle 40 and tank filters 50 in a raised position in accordance with some embodiments of the invention. In some embodiments, tank filters can comprise a first filter 57 and/or a second filter 59 as shown.

In some embodiments, the tank baffle 40 can be positioned in the front end 1a between the tank filters 50 and an outlet section 1g of the tank housing 1h that includes outlet volume 2c. In some embodiments, the tank baffle 40 can function to direct fluid for improved hydraulic performance. In some embodiments, the arrangement of the tank filters 50 and/or tank baffle 40 can enable portions of the inner volume 2 of the tank assembly 1 to be compartmentalized or customized into a plurality of fluidly coupled or interconnected regions. For example, in some embodiments, the tank assembly 1 can comprise a main volume 2a and filtered volume 2b of the inner volume 2 that can be formed by a temporary, semi-temporary, or permanent placement of one or more tank filters 50 as shown. Further, in some embodiments, a temporary, semi-temporary, or permanent placement of a tank baffle 40 between the filtered volume 2b and the outlet volume 2c can create or enable a fluidly coupled outlet volume 2c. In some embodiments, depending on the specific fluid volume with the inner volume 2 and/or whether the tank filters 50 and/or tank baffle 40 are in place within the tank assembly 1, at least some fluid can fluidly couple from the main volume 2a and/or filtered volume 2b, and/or outlet volume 2c. In some embodiments, the selectable or customizable inner volume 2 can enable an owner or breeder to customize the aquatic environment of any aquatic animals within any portion of the inner volume 2.

In some embodiments of the invention, one or more tank filters 50 and/or the tank baffle 40 can be removed or inserted into the inner volume 2 of the tank assembly 1. For example, FIG. 3 illustrates the tank assembly of FIG. 1 with tank lid 30 removed and tank baffle 40 and tank filters 50 in a raised position in accordance with some embodiments of the invention. FIG. 4 illustrates the tank assembly 1 of FIG. 1 with tank lid 30 and tank filters 50 removed and tank baffle 40 in a raised position in accordance with some embodiments of the invention. In some embodiments, one or more tank filters 50 can be installed or removed from the inner volume 2. The methods of insertion and removal, and the structural features related to insertion and retention of the tank filters 50 and tank baffle 40 are discussed below in relation to at least FIG. 5B and FIGS. 8A-8C. The non-limiting embodiment shown in FIG. 3 illustrates a representation of the insertion of two tank filters 50 and a tank baffle 40, however in some embodiments, the number of tank filters 50 can vary (more or less than that shown), and one or more tank baffles 40 can be included or not included based on user requirements.

Figure 5B:
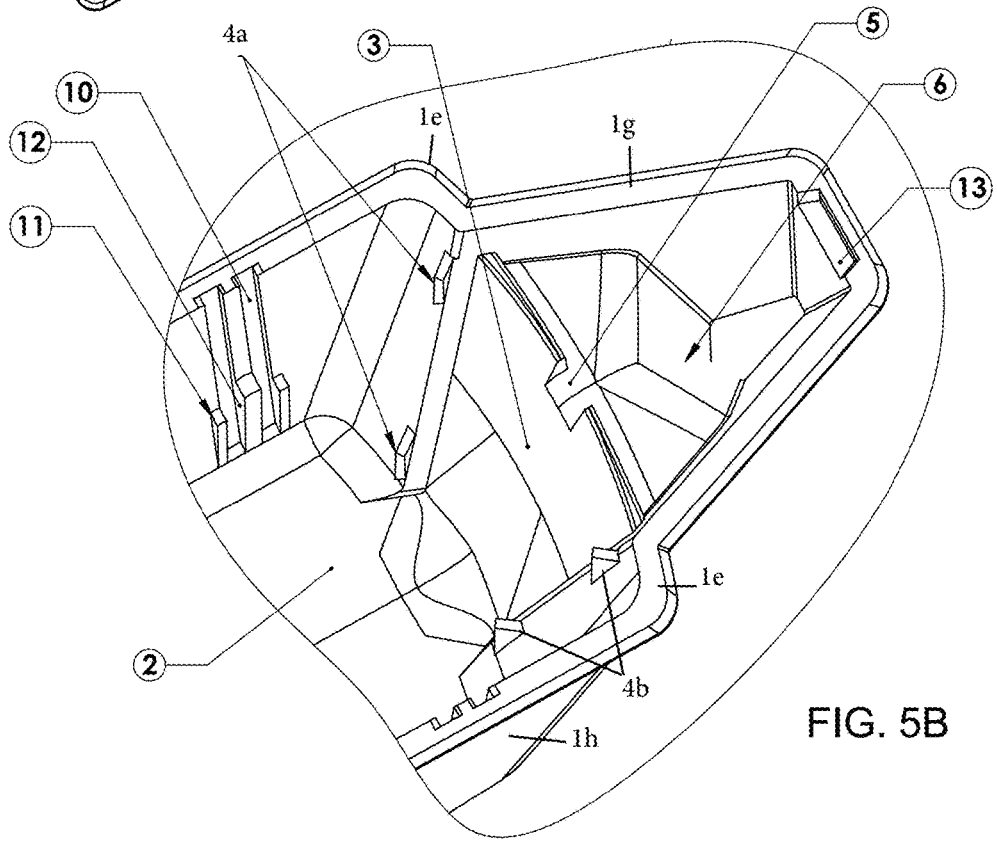
FIG. 5B illustrates a close-up of a front end of the tank assembly of FIG. 1 with tank lid, tank baffle, and tank filters removed in accordance with some embodiments of the invention.

In some embodiments of the invention, the tank lid 30 can be secured to, released from, and/or pivoted on the tank housing 1h using a tank lid snap housing (coupler 7) located on the upper edge of the rear side wall 1d. For example, FIG. 5A illustrates the tank assembly of FIG. 1 with tank lid, tank baffle, and tank filters removed in accordance with some embodiments of the invention. Further details of the coupler 7 and associated tabs 8 are discussed below in reference to FIGS. 6A and 6B. In reference to FIG. 5B, illustrating a close-up of a front end 1a of the tank assembly of FIG. 1 with tank lid 30, tank baffle 40, and tank filters 50 removed in accordance with some embodiments of the invention. As discussed earlier, in some embodiments of the invention, one or more tank filters 50 and/or the tank baffle 40 can be removed or inserted into the inner volume 2 of the tank assembly 1. In some embodiments, a single tank filter 50 can be installed or removed from the inner volume 2. In other embodiments, a plurality of tank filters 50 can be installed or removed from the inner volume 2. In some embodiments, the side wall 1c can include one or more channels or guides 10 into which edges of the tank filters 50 can be inserted. In some embodiments, the guides 10 can function to provide a guide for insertion of a tank filter 50 and/or can function to position and/or retain the tank filter 50 once inserted into the inner volume 2. Further, some embodiments include one or more extensions 11 that can couple with an extension or tabs of a tank filter 50 (discussed further below in relation to FIGS. 9A and 9B). In some embodiments, the tank filter 50 can provide at least some filtering function. In some embodiments, the tank filter 50 can provide adequate fluid filtration.

In the non-limiting embodiment shown in FIG. 5B, two guides 10 are shown, with each guide 10 corresponding to one of the two tank filters 50 shown in FIG. 3. However, the number of guides 10 can vary (more or less than that shown) based on user requirements (i.e., based on a specified number of tank filters 50). Further, in some embodiments, the locations of the guides 10 can vary. For example, in some embodiments, the guides 10 shown in FIG. 5B can be spaced further apart. In some embodiments, with two or more guides 10, one or more long ribs or separators 12 can be positioned extending into the inner volume 2 from the side walls 1c between guides 10. In some embodiments, one or more separators 12 can function to aid in maintaining a separation between tank filters 50. In some embodiments, the one or more separators 12 can function to aid in alignment of one or more tank filters 50.

Referring back to FIG. 5A, and to FIG. 5B, the illustrations are shown within an inserted tank baffle 40 revealing structure of the tank housing 1h in the region of the filtered volume 2b and outlet volume 2c. For example, some embodiments include an outlet section 1g with main flow wall 3 that extends between the two side walls 2c at the front end 1a proximate to where the outlet section 1g extends from the front end 1a of the tank housing 1h. For example, some embodiments include main flow wall 3 extending between the front side walls 1e proximate the outlet section 1g and positioned within the inner volume 2, and at least partially within the filtered volume 2b and/or the outlet volume 2c. In some embodiments, the main flow wall 3 can function to provide improved fluid guidance. In some embodiments, the main flow wall 3 can include at least one slot 5. Further, in some embodiments, the outlet section 1g can include at least one lock cavity 13 positioned at the end of the outlet section 1g opposite the end proximate the main flow wall 3. Further, as illustrated in the close-up of the front end 1a of the tank assembly 1h shown in FIG. 5B, some embodiments include a tank baffle holder rib comprising (upper and lower notches 4a) positioned at the inner end of the front side wall 1e on one side, and upper and lower extensions 4b positioned at the inner end of the front side wall 1e on an opposite side. In some embodiments, the upper and lower notches 4a and upper and lower extensions 4b can be used to couple, secure, and/or retain a tank baffle 40, as discussed further below in respect to FIGS. 8A-8C.

FIG. 6A illustrates a side perspective view of the tank assembly 1 of FIG. 1 with tank lid 30, tank baffle 40, and tank filters 50 removed for clarity in accordance with some embodiments of the invention. In some embodiments of the invention, the tank housing 1h can include one or more nesting ribs 16 extending across a portion of the tank housing 1h. In some embodiments, the nesting ribs 16 provide adequate stop to prevent nesting sticking. For example, some embodiments include nesting ribs 16 extending from adjacent tank spawning insert notches (slots 9) on a top side of the tank housing 1h (and proximate a tank lid 30 when in place), towards a lower end of the tank housing 1h. In some embodiments, the slots 9 can accommodate or support other features or additions including a spawning insert.

In reference to FIG. 6D, some embodiments include an extension of the side walls 1c comprising one or more rack feet 14 and/or feet 15 forming a stand portion, extension, or leg. Further, some embodiments include a tank level locator 17 extending through the rear side wall 1d. In some embodiments, addition vents or apertures can be included at least in the rear side wall 1d, or in other portions of the tank assembly 1. In some embodiments, the rack feet 14 and/or feet 15 enable a required sloping angle for the tank assembly 1.

FIG. 6B illustrates a close-up view of an upper portion of the back end 1b of the tank assembly 1 of FIG. 1 in accordance with some embodiments of the invention. As discussed earlier, in some embodiments of the invention, the tank lid 30 can be secured to, released from, and/or pivoted on the tank housing 1h using a coupler 7 located on the upper edge of the rear side wall 1d. In some embodiments, the coupler 7 can include moveable tabs 8 suitable for coupling to portions of the tank lid 30 (including locking the tank housing 1h and the lid 30). For example, in some embodiments, the tank lid 30 can be reversibly coupled to the top side of edge of the tank housing 1h by coupling to the coupler 7. FIG. 7A illustrates a tank lid 30 of the tank assembly 1, and FIG. 7B illustrates an inner side view of the tank lid 30, and FIG. 7D illustrates a close-up view of a portion of the back end 1b of the tank assembly 1, showing lid snap 35 which can function to lock the tank housing 1h and the lid 30. In some embodiments, the tank lid 30 can comprise a main body 30c extending from a front end 30a to back end 30b, with outlet portion 30d extending from the main body 30c at the front end 30a, and a lower rim 37 extending at least partially around the main body 30c. In some embodiments, the lower rim 37 can be positioned at least partially within the inner volume 2 when the tank lid 30 is coupled to the tank housing 1h. In some embodiments, the lower rim 37 can create an improved alignment between the lid 30 and the tank housing 1h.

As further shown in this non-limiting embodiment are tabs 35a extending from an inner wall of the lid snap 35 positioned at the back end 30b. Referring back to FIGS. 6A and 6B, in some embodiments, the lid 30 can be secured or unsecured to and from lid snap 35 when the coupler 7 is at least partially inserted into the lid snap 35, and the tabs 35a can reversibly couple to the tabs 8. FIG. 10C illustrates an end cross-sectional view of the section A-A of the tank assembly 1 of FIG. 1 as shown in FIG. 10B in accordance with some embodiments of the invention, and shows an example embodiment of the tabs 35a that can reversibly couple to the tabs 8. In some embodiments, the reversible coupling of the tank lid 30 with the tank housing 1h can be facilitated using lid tab 34 that extends from the lid snap 35. In some embodiments, a user can grasp the lid tab 34 to selectively engage or disengage the couplers 7, 35, and tabs 35a, 8, and thus selectively couple or decouple the tank lid 30 at least at the back end 1b of the tank assembly 1.

In some embodiments, the coupling of the tank lid 30 at the front end 1a of the tank assembly 1 can be facilitated by one or more structures on the tank lid 30 and/or the tank housing 1h at the from end 1b. For example, FIG. 6C illustrates a close-up view of an upper portion of the front end 1b of the tank assembly 1 of FIG. 1 in accordance with some embodiments of the invention. Further, FIG. 7C illustrates a view of a portion of a locking tongue 36 of the tank lid 30 of the tank assembly 1 of FIG. 1 in accordance with some embodiments of the invention (marked as region 7C in FIG. 7B). In some embodiments, the front end 1b of the tank housing 1h can include a lock cavity 13 that can couple to the locking tongue 36 of the tank lid 30 (positioned extending from outlet portion 30d) when the tank lid 30 is coupled to the tank housing 1h at the front end 1a. In some embodiments, a user can press or force the locking tongue 36 at least partially into the lock cavity 13 to at least partially close or secure the tank lid 30 onto the tank housing 1h to form the tank assembly 1. In some embodiments, a user can pull or force the locking tongue 36 at least partially from the lock cavity 13 to at least partially remove or release the tank lid 30 from the tank housing 1h of the tank assembly 1.

FIG. 6D illustrates a close-up view of a lower portion or base of the tank assembly 1 of FIG. 1 in accordance with some embodiments of the invention. In some embodiments, the tank housing 1h can include feet 15, with one at each end 1a, 1b and extending from the tank housing 1h on each side of the tank housing 1h and separated on each side by rack feet 14. In some embodiments of the invention, at least one of the feet 15 can each provide a support for the tank assembly 1 and/or at least the tank housing 1h when placed or positioned on a surface.

In some embodiments, the tank lid 30 can include one or more structures for access to the inner volume 2. For example, referring again to FIG. 7A, illustrating a tank lid 30 of the tank assembly 1, in some embodiments, the tank lid 30 can include a lid front boss (shown as upper housing 31) positioned at the back end 30b of the tank lid 30 extending from the main body 30c. In some embodiments, the upper housing 31 can enable appropriate lid 30 installation. In some embodiments, the upper housing 31 can comprise one or more apertures facilitating access, observation, and/or air flow. For example, some embodiments include lid fluid slot 32 extending across a portion of the upper housing 31 towards the front end 1a. In some embodiments, the lid fluid slot 32 can provide ease of access to fluid inlet.

Some further embodiments include a lid food slot 33 extending across a portion of the upper housing 31 towards the back end 1b and adjacent to the lid tab 34. In some embodiments, the lid food slot 33 can provide for access for feeding without the need to remove the lid 30. In some embodiments, the apertures can vary in number and size and/or position on the upper housing 31. Further, some embodiments can include one or more similar apertures or vents in other regions of the tank lid 30.

In reference to FIG. 5B, and the earlier discussion related to the upper and lower notches 4a and extensions 4b positioned at the inner end of the front side wall 1e on an opposite side, and the ability for the upper and lower notches 4a and upper and lower extensions 4b being able to secure, and/or retain tank baffle 40 in the tank housing 1h, in some embodiments, the tank baffle 40 can include one or more structures that can couple with the upper and lower notches 4a and upper and lower extensions 4b. For example, FIG. 8B illustrates a close-up view of a baffle 40 of the tank assembly 1 of FIG. 1 in accordance with some embodiments of the invention, and FIG. 8A illustrates an outward-facing perspective view of a baffle 40 of the tank assembly 1 of FIG. 1 in accordance with some embodiments of the invention (with region 8B of FIG. 8B shown). Further, FIG. 8C illustrates an outward-facing perspective view of a baffle 40 of the tank assembly 1 of FIG. 1 in accordance with some embodiments of the invention. In some embodiments of the invention, one side of the baffle 40 can include at least one tab and the other side can include at least one receiver. For example, some embodiments include baffle springs 41a on one side and/or upper and lower receivers 41b on an opposite side. In some embodiments, the baffle springs 41a can ensure an optimal fit between the tank housing 1h and the baffle 40, where surface 44 (shown in FIG. 8B) can ensure an optimal seal between the baffle 40 and the tank housing 1h. In some embodiments, when the baffle 40 is at least partially positioned in the inner volume 2, the baffle springs 41a can couple to or be positioned into upper and lower notches 4a, and/or at least one of the upper and lower extensions 4b of the tank housing 1h can be positioned into an upper and/or lower receiver 41b of the baffle 40. In some embodiments, the coupling of the baffle springs 41a into the notches 4a and/or the coupling of the upper and lower extensions 4b into the upper and lower receivers 41b can be a mechanical and/or a friction coupling. In some embodiments, at least one of the baffle springs 41a and/or the upper and lower extensions 4b can flex, bend or move when being positioned into or out of the respective notches 4a and receivers 41b. In some embodiments, the number and position of the notches 4a and/or extensions 4b, and/or baffle springs 41a and/or receivers 41b can vary beyond the non-limiting embodiments described herein. For example, some embodiments include more or fewer notches 4a and/or extensions 4b, and/or baffle springs 41a and/or receivers 41b than shown and described.

In some embodiments, the baffle 40 can comprise a plurality of baffle overflow slots 42 extending through the baffle overflow ramp 46 at the top end 46a, and a baffle locating ridge 45 extending across the baffle overflow ramp 46 from one side to an opposite side. In some embodiments, the baffle locating ridge 45 can ensure an optimal fit between the tank housing 1h and the baffle 40. In some embodiments, the baffle overflow slot 42 can ensure optimal fluid drainage in case of any blockages in one or more fluid pathways. Further, in some embodiments, the baffle 40 can include a baffle fluidway 43 extending a least a partial length of the baffle 40. In some embodiments, the baffle fluidway 43 can extend from adjacent the baffle locating ridge 45 towards the bottom end 46b of the baffle overflow ramp 46. Further, in some embodiments, the baffle fluidway 43 can extend from adjacent the baffle locating ridge 45 towards the bottom end 46b of the baffle overflow ramp 46 and extend into a trough 47 that extends from one side of the baffle 40 to the opposite side of the baffle 40. In some embodiments, the baffle fluidway 43 can ensure optimal fluid guidance. Referring to the cross-sectional view of FIG. 10A and the partial perspective of FIG. 5B, in some embodiments, the baffle fluidway 43 can fluidly couple to outlet channel 5a coupled to a final fluid outlet 6 in the outlet section 1g via fluid outlet 5. In some embodiments, the final fluid outlet 6 can provide fluid outlet guidance.

Figure 9A:
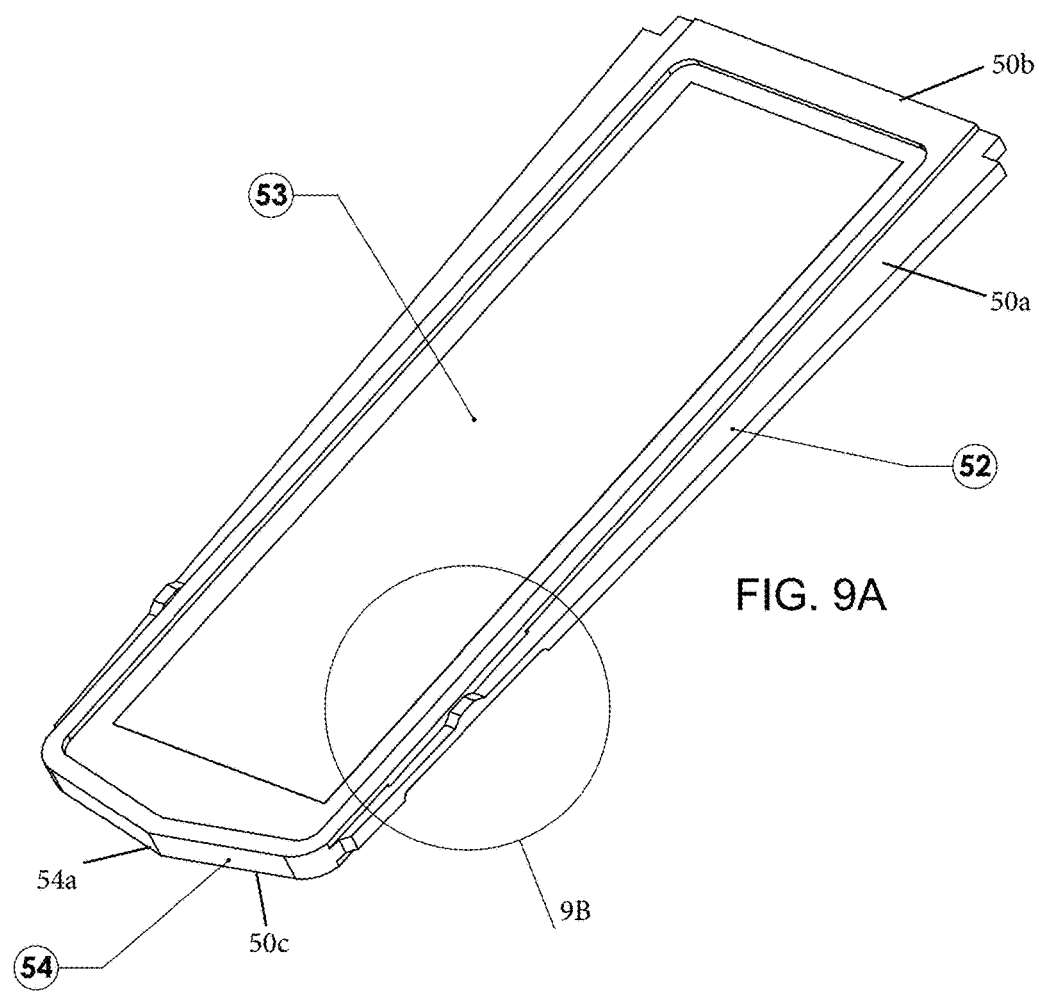
FIG. 9A illustrates a perspective view of a tank filter of the tank assembly of FIG. 1 in accordance with some embodiments of the invention.
Figure 9B:
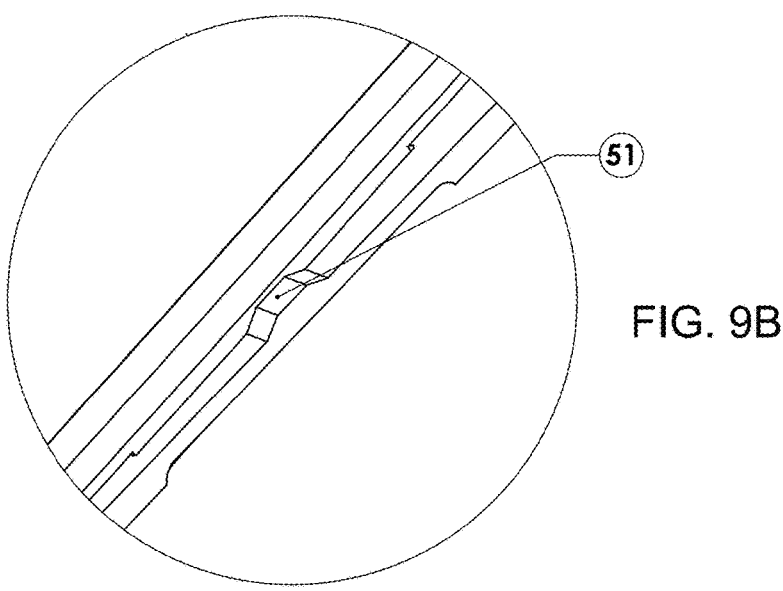
FIG. 9B illustrates a perspective view of an edge portion of the tank filter of the tank assembly of FIG. 9A in accordance with some embodiments of the invention.

Some embodiments further include notches, tabs, extensions, or other conventional coupling means to secure one or more other structures of the tank assembly 1. For example, as discussed earlier, some embodiments include tank filter housing slots such as one or more channels or guides 10 into which edges of the tank filters 50 can be inserted, and some embodiments include one or more short ribs or extensions 11 that can couple with an extension or tab of a tank filter 50. For example, FIG. 9A illustrates a perspective view of a tank filter 50 of the tank assembly 1 of FIG. 1 in accordance with some embodiments of the invention, and FIG. 9B illustrates a perspective view of an edge portion of the tank filter 50 of the tank assembly 1 of FIG. 9A in accordance with some embodiments of the invention (with region 9B of FIG. 9A shown represented in FIG. 9B). In some embodiments, the tank filter 50 can comprise a frame 50a including a top end 50b, and a bottom end 50c, and side-edges 52. In some embodiments, a filter, screen or mesh (element 53) can be positioned in the frame 50a and/or supported, fixed, and/or integrated with the filter, screen or mesh 53 to provide at least some fluid filtration. In some embodiments, the bottom end 50c can comprise two angled or inwardly sloped sides 54. In some embodiments, the angled or inwardly sloped sides 54 are shaped to complement the bottom surfaces 2d of the tank housing 1h (see for example FIG. 5A where the centerline 2e corresponds to lowest point of the inner volume 2 that is configured to couple with the apex 54a of the tank filter 50, and thus bottom surfaces 2d can comprise a sloped bottom of the tank assembly 1). In some embodiments, the filter, screen or mesh 53 can enable fluid flow between the main volume 2a and the filtered volume 2b and/or the outlet volume. In some embodiments, the sloped bottom surfaces 2d can provide improved debris guidance. In some embodiments, the filter, screen or mesh 53 can prevent transfer of suspended material and/or aquatic animals between the main volume 2a and the filtered volume 2b and/or the outlet volume.

In some embodiments, the tank filter 50 can include at least one filter spring 51 positioned on an edge or side or side-edge 52 of the tank filter 50. In some embodiments, the filter spring 51 can provide at least a partial seal with the tank housing 1h. For example, some embodiments include at least one filter spring 51 positioned on one side-edge 52 of the tank filter 50. In some embodiments, during insertion of the tank filter 50 into the inner volume 2, at least one filter spring 51 can couple and/or slide over an extension 11 of the tank housing 1h. In some embodiments, the coupling of one or more filter tabs 51 with the extension 11 can be a mechanical and/or a friction coupling. In some embodiments, at least one filter spring 51 and/or extension 11 can flex, bend or move when the filter 50 is being inserted or removed from the inner volume 2 of the tank housing 1h. The number and position of the filter tabs 51 and/or extensions 11 can vary beyond the non-limiting embodiments described herein. For example, some embodiments include more or less filter tabs 51 and/or extensions 11.

The overall architecture, shape and volume proportions of the inner volume 2 can be further understood from the illustration of FIG. 10A, which shows a side cross-sectional view of the tank assembly 1 of FIG. 1 in accordance with some embodiments of the invention, and FIG. 10B illustrating a top cross-sectional view of the tank assembly 1 of FIG. 1 in accordance with some embodiments of the invention. In some embodiments, the outlet section 1g of the tank housing 1h that includes outlet volume 2c can extend up to about one half of the height of the tank housing 1h as shown. In other embodiments, the outlet section 1g of the tank housing 1h that includes outlet volume 2c can extend less than half the height of the tank housing 1h or more than the height of the tank housing 1h. In some embodiments, the main volume 2a, and/or the filtered volume 2b can change based on the position of one or more tank filters 50.

FIG. 11 illustrates a perspective view of a tank assembly 101 in accordance with some further embodiments of the invention. Some embodiments of the invention include a tank assembly 101 comprising a tank lid 1030 coupled to a tank housing 101h that comprises a front end 101a and a back end 101b, with side walls 101c extending on each side from a rear side wall 101d to a front side wall 101e. In some embodiments, the tank lid 1030 can comprise a main body 1030c extending from a front end 1030a to a back end 1030b, with outlet portion 1030d extending from the main body 1030c at the front end 1030a. Some further illustrations included herein show some views of components or portions of the tank assembly 101 that can allow visualization of the external and internal components and portions of the tank assembly 101. For example, FIG. 12 illustrates the tank assembly 101 of FIG. 11 with tank lid 1030 shown removed in accordance with some embodiments of the invention. This illustration reveals various internal spaces and components of the tank assembly 101, including, as a non-limiting example embodiment, one or more tank filters 1050 that can be positioned in the tank housing 1010 towards the front end 101a. In some embodiments, the filters 1050 can be removed and/or replaced. Further, FIG. 13 illustrates the tank assembly 101 of FIG. 11 with tank lid 1030 removed, and tank filters 1050 in a raised position in accordance with some embodiments of the invention. In some embodiments, tank filters 1050 can comprise a first filter 1057 and/or a second filter 1059 as shown.

Some embodiments include a removable or replaceable tank baffle 1040 as shown. In some embodiments, the tank baffle 1040 can be positioned in the front end 101a between the tank filters 1050 and an outlet section 101g of the tank housing 101h that includes outlet volume 102c. In some embodiments, the tank baffle 1040 can function to direct fluid for improved hydraulic performance. In some embodiments, the arrangement of the tank filters 1050 and/or tank baffle 1040 can enable portions of the inner volume 102 of the tank assembly 101 to be compartmentalized or customized into a plurality of fluidly coupled or interconnected regions. For example, in some embodiments, the tank assembly 101 can comprise a main volume 102a and filtered volume 102b of the inner volume 102 that can be formed by a temporary, semi-temporary, or permanent placement of one or more tank filters 1050 as shown. Further, in some embodiments, a temporary, semi-temporary, or permanent placement of a tank baffle 1040 between the filtered volume 102b and the outlet volume 102c can create or enable a fluidly coupled outlet volume 102c. In some embodiments, depending on the specific fluid volume with the inner volume 102 and/or whether the tank filters 1050 and/or tank baffle 1040 are in place within the tank assembly 101, at least some fluid can fluidly couple from the main volume 102a and/or filtered volume 102b, and/or outlet volume 102c. Some embodiments include a selectable or customizable inner volume 102 that can enable an owner or breeder to customize the aquatic environment of any aquatic animals within any portion of the inner volume 102.

In some embodiments of the invention, one or more tank filters 1050 and/or the tank baffle 1040 can be reversibly inserted into the inner volume 102 of the tank assembly 101. For example, FIG. 13 illustrates the tank assembly 101 of FIG. 11 with tank lid 1030 removed and tank baffle 1040 and tank filters 1050 in a raised position in accordance with some embodiments of the invention. FIG. 14 illustrates the tank assembly 101 of FIG. 11 with tank lid 1030 and tank filters 1050 removed and tank baffle 1040 in a raised position in accordance with some embodiments of the invention. In some embodiments of the invention, one or more tank filters 1050 can be installed or removed from the inner volume 102. The non-limiting embodiment shown in FIG. 13 illustrates a representation of the insertion of two tank filters 1050 and a tank baffle 1040, however in some embodiments, the number of tank filters 1050 can vary (i.e., can be more or less than that shown). Further, in some embodiments, one or more tank baffles 1040 can be included or not included based on user requirements. The methods of insertion and removal, and the structural features related to insertion and retention of the tank filters 1050 and tank baffle 1040 in the tank housing 101h are described below in relation to at least FIG. 15B and FIGS. 18A-18C.

Figure 15A:
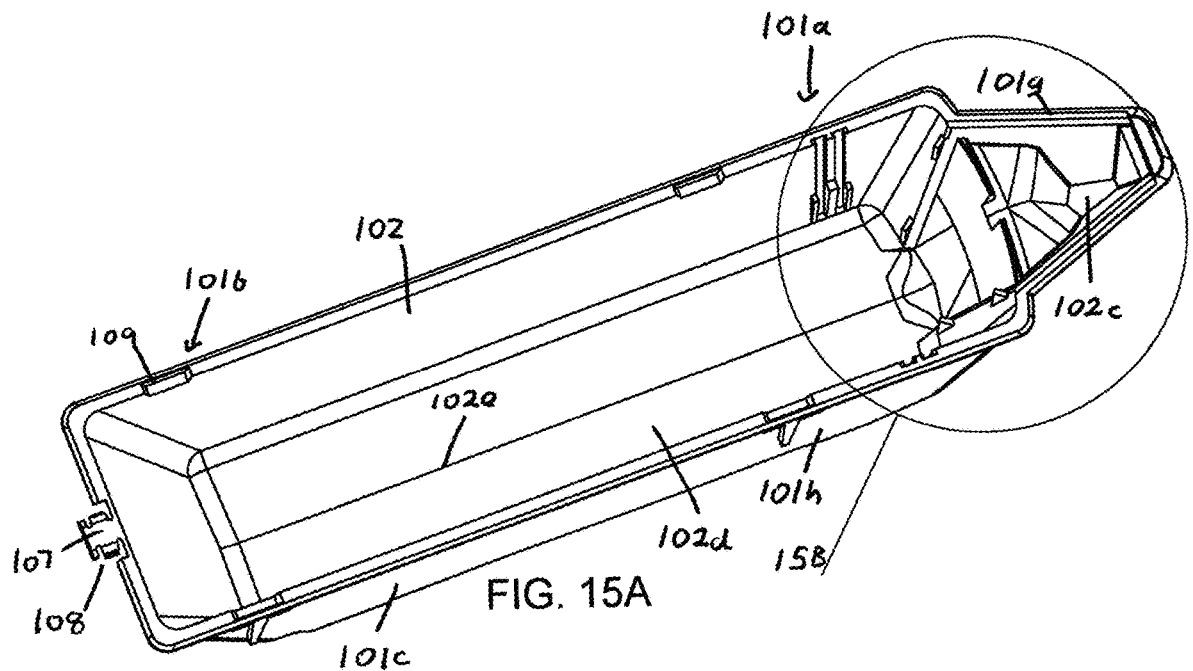
FIG. 15A illustrates the tank assembly of FIG. 11 with tank lid, tank baffle, and tank filters removed in accordance with some further embodiments of the invention.
Figure 15B:
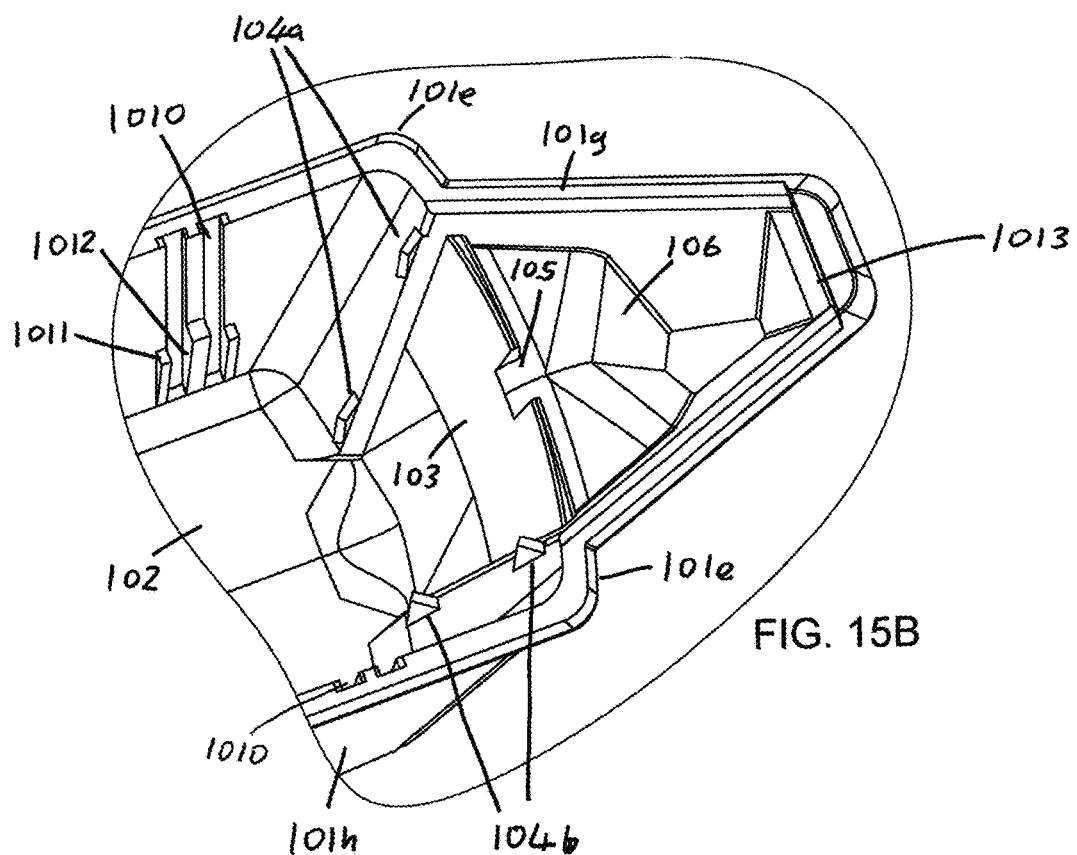
FIG. 15B illustrates a close-up of a front end of the tank assembly of FIG. 11 with tank lid, tank baffle, and tank filters removed in accordance with some further embodiments of the invention.

In some embodiments of the invention, the tank lid 1030 can be secured to, released from or slid from, and/or pivoted on the tank housing 101h using a tank lid snap housing (coupler 107) located on the upper edge of the rear side wall 101d. For example, FIG. 15A illustrates the tank assembly 101 of FIG. 11 with tank lid 1030, tank baffle 1040, and tank filters 1050 removed in accordance with some embodiments of the invention (with region 15B represented in FIG. 15B). Further details of the coupler 107 and associated tabs 108 are discussed below in reference to FIGS. 16A and 16B, and further, in reference to FIG. 15B, illustrating a close-up of a front end 11a of the tank assembly of FIG. 11 with tank lid 1030, tank baffle 1040, and tank filters 1050 removed in accordance with some embodiments of the invention. As discussed earlier, in some embodiments of the invention, one or more tank filters 1050 and/or the tank baffle 1040 can be removed or inserted into the inner volume 102 of the tank assembly 101. In some embodiments, a single tank filter 1050 can be installed or removed from the inner volume 102. In other embodiments, a plurality of tank filters 1050 can be installed or removed from the inner volume 102. In some embodiments, the side wall 101c can include one or more channels or guides 1010 into which edges of the tank filters 1050 can be inserted. In some embodiments, the guides 1010 can function to provide a guide for insertion of a tank filter 1050 and/or can function to position and/or retain the tank filter 1050 once inserted into the inner volume 102. Further, some embodiments include one or more extensions 1011 that can couple with an extension or tabs of a tank filter 1050 (discussed further below in relation to FIGS. 19A and 19B). In some embodiments, the tank filter 1050 can provide at least some filtering function. In some embodiments, the tank filter 1050 can provide adequate fluid filtration.

In the non-limiting embodiment shown in FIG. 15B, two guides 1010 are shown, with each of the guides 1010 corresponding to one of the two tank filters 1050 shown in FIG. 13. However, the number of the guides 1010 can vary (i.e., can be more or less than that shown) based on user requirements (i.e., based on a specified number of tank filters 1050). Further, in some embodiments, the locations of the guides 1010 can vary. For example, in some embodiments, the guides 1010 shown in FIG. 15B can be spaced further apart. In some embodiments, with two or more guides 1010, one or more long ribs or separators 1012 can be positioned extending into the inner volume 102 from the side walls 101c between guides 1010. In some embodiments, one or more separators 1012 can aid in maintaining a separation between tank filters 1050. In some embodiments, the one or more separators 1012 can function to aid in alignment of one or more tank filters 1050.

Referring back to FIG. 15A, and to FIG. 15B, the illustrations are shown within an inserted tank baffle 1040 revealing structure of the tank housing 101h in the region of the filtered volume 102b and outlet volume 102c. For example, some embodiments include an outlet section 101g with main flow wall 103 that extends between the two side walls 102c at the front end 101a proximate to where the outlet section 101g extends from the front end 101a of the tank housing 101h. For example, some embodiments include main flow wall 103 extending between the front side walls 101e proximate the outlet section 101g and positioned within the inner volume 102, and at least partially within the filtered volume 102b and/or the outlet volume 102c. In some embodiments, the main flow wall 103 can function to provide improved fluid guidance. In some embodiments, the main flow wall 103 can include at least one slot 105. Further, in some embodiments, the outlet section 101g can include at least one lock cavity 1013 positioned at the end of the outlet section 101g opposite the end proximate the main flow wall 103. Further, as illustrated in the close-up of the front end 101a of the tank assembly 101h shown in FIG. 15B, some embodiments include a tank baffle holder rib comprising (upper and lower notches 104a) positioned at the inner end of the front side wall 101e on one side, and upper and lower extensions 104b positioned at the inner end of the front side wall 101e on an opposite side. In some embodiments, the upper and lower notches 104a and upper and lower extensions 104b can be used to couple, secure, and/or retain a tank baffle 1040, as discussed further below in respect to FIGS. 18A-18C.

FIG. 16A illustrates a side perspective view of the tank assembly 101 of FIG. 11 in accordance with some embodiments of the invention, with tank lid 1030, tank baffle 1040, and tank filters 1050 removed for clarity, and region 16C marked and illustrated in FIG. 16C. As illustrated, in some embodiments, the tank housing 101h can include one or more nesting ribs 1016 extending across a portion of the tank housing 101h. In some embodiments, the nesting ribs 1016 can provide an adequate stop to prevent nesting sticking. For example, some embodiments include nesting ribs 1016 that can extend from adjacent tank spawning insert notches (slots 109) on a top side of the tank housing 101h (and proximate a tank lid 1030 when in place), towards a lower end of the tank housing 101h. In some embodiments, the slots 109 can accommodate or support other features or additions including a spawning insert.

In reference to FIG. 6D, some embodiments include an extension of the side walls 101c comprising one or more rack feet 1014 and/or feet 1015 forming a stand portion, extension, or leg. Further, some embodiments include a tank level locator 1017 extending through the rear side wall 101d. In some embodiments, addition vents or apertures can be included at least in the rear side wall 101d, or in other portions of the tank assembly 101. In some embodiments, the rack feet 1014 and/or feet 1015 enable a required sloping angle for the tank assembly 101.

FIG. 16B illustrates a close-up view of an upper portion of the back end 101b of the tank assembly 101 of FIG. 11 in accordance with some embodiments of the invention. As discussed earlier, in some embodiments of the invention, the tank lid 1030 can be secured to, slid from, released from, and/or pivoted on the tank housing 101h using a coupler 107 located on the upper edge of the rear side wall 101d. In some embodiments of the invention, the coupler 107 that can include moveable tabs 108 suitable for coupling to portions of the tank lid 1030 (including locking the tank housing 101h and the lid 1030). For example, in some embodiments, the tank lid 1030 can be reversibly coupled to the top side of edge of the tank housing 101h by coupling to the coupler 107.

FIG. 17A illustrates a tank lid 1030 of the tank assembly 101, and FIG. 17B illustrates an inner side view of the tank lid 1030, with region 17D marked and shown in FIG. 17D, illustrating a close-up view of a portion of the back end 101b of the tank assembly 101, showing lid snap 1035 which can function to lock the tank housing 101h and the lid 1030. In some embodiments, the tank lid 1030 can comprise a main body 1030c extending from a front end 1030a to back end 1030b, with outlet portion 1030d extending from the main body 1030c at the front end 1030a, and a lower rim 1037 extending at least partially around the main body 1030c. In some embodiments, the lower rim 1037 can be positioned at least partially within the inner volume 102 when the tank lid 1030 is coupled to the tank housing 101h. In some embodiments, the lower rim 1037 can create an improved alignment between the lid 1030 and the tank housing 101h. Further, FIG. 17E illustrates close-up view of an end of the tank lid 1030 in accordance with some further embodiments of the invention, and shows the lid locking tongue 1036 extending from the front end 1030a, end surface 1036c, and edge 1036d.

Figures 20A, 20C:
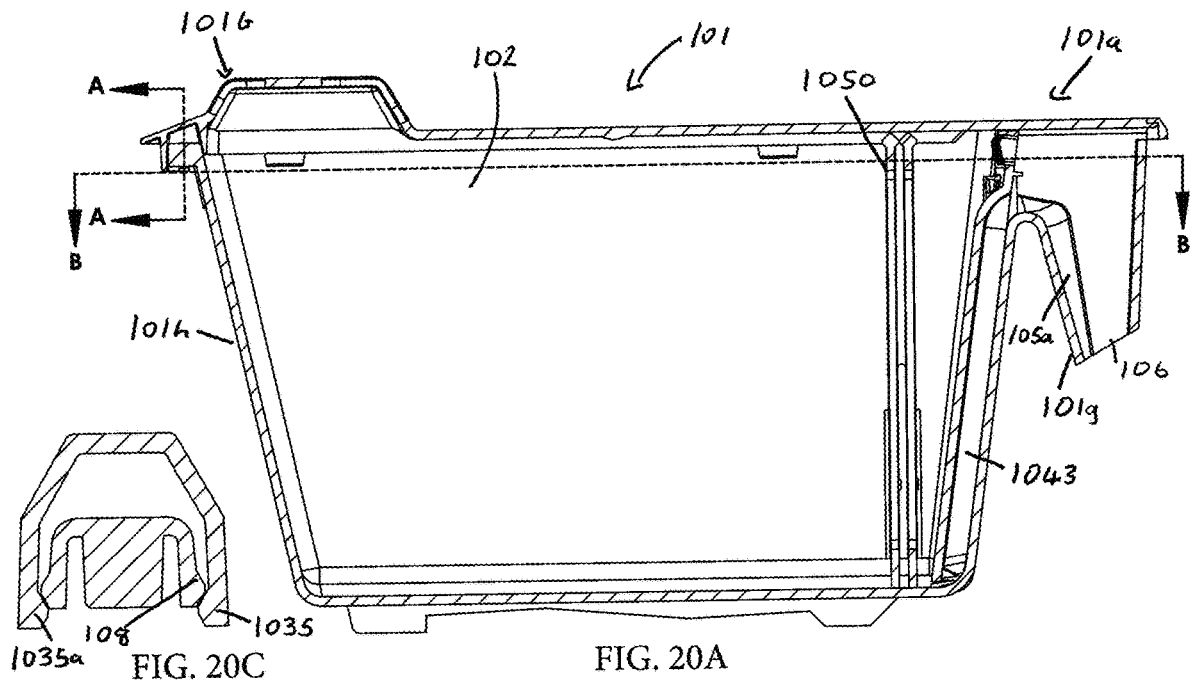
FIG. 20A illustrates a side cross-sectional view of the tank assembly of FIG. 11 in accordance with some further embodiments of the invention.
FIG. 20C illustrates an end cross-sectional view of the section A-A of the tank assembly of FIG. 11 as shown in FIG. 20B in accordance with some further embodiments of the invention.

In some embodiments of the invention, the tabs 1035a can extend from an inner wall of the lid snap 1035 positioned at the back end 1030b. Referring back to FIGS. 16A and 16B, in some embodiments, the lid 1030 can be reversibly secured to and from lid snap 1035 when the coupler 107 is at least partially inserted into the lid snap 1035, and the tabs 1035a can reversibly couple to the tabs 108. FIG. 20C illustrates an end cross-sectional view of the section A-A of the tank assembly 101 of FIG. 11 as shown in FIG. 20A in accordance with some embodiments of the invention, and shows an example embodiment of the tabs 1035a that can reversibly couple to the tabs 108. In some embodiments, the reversible coupling of the tank lid 1030 with the tank housing 101h can be facilitated using lid tab 1034 that extends from the lid snap 1035. In some embodiments, a user can grasp the lid tab 1034 to selectively engage or disengage the couplers 107, 1035, and tabs 1035a, 108, and thus selectively couple or decouple the tank lid 1030 at least at the back end 101b of the tank assembly 101.

In some embodiments, the coupling of the tank lid 1030 at the front end 101a of the tank assembly 101 can be facilitated by one or more structures on the tank lid 1030 and/or the tank housing 101h at the from end 101b. For example, FIG. 16C illustrates a close-up view of an upper portion of the front end 101b of the tank assembly 101 of FIG. 11 in accordance with some embodiments of the invention. Further, FIG. 17C illustrates a view of a portion of a locking tongue 1036 of the tank lid 1030 (shown in FIG. 17B where area 17C represents FIG. 17C) of the tank assembly 101 of FIG. 11 in accordance with some embodiments of the invention. In some embodiments, the front end 101b of the tank housing 101h can include a lock cavity 1013 that can couple to the locking tongue 1036 of the tank lid 1030 (positioned extending from outlet portion 1030d) when the tank lid 1030 is coupled to the tank housing 101h at the front end 101a. In some embodiments, a user can press or force the locking tongue 1036 at least partially into the lock cavity 1013 to at least partially close or secure the tank lid 1030 onto the tank housing 101h to form the tank assembly 101. In some embodiments, a user can pull or force the locking tongue 1036 at least partially from the lock cavity 1013 to at least partially remove or release the tank lid 1030 from the tank housing 101h of the tank assembly 101.

FIG. 16D illustrates a close-up view of a lower portion or base of the tank assembly 101 of FIG. 11 in accordance with some embodiments of the invention. In some embodiments, the tank housing 101h can include feet 1015, with one at each end 101a, 101b and extending from the tank housing 101h on each side of the tank housing 101h and separated on each side by rack feet 1014. In some embodiments of the invention, at least one of the feet 1015 can each provide a support for the tank assembly 101 and/or at least the tank housing 101h when placed or positioned on a surface.

In some embodiments, the tank lid 1030 can include one or more structures for access to the inner volume 102. For example, referring again to FIG. 17A, illustrating a tank lid 1030 of the tank assembly 101, in some embodiments, the tank lid 1030 can include a lid front boss (shown as upper housing 1031) positioned at the back end 1030b of the tank lid 1030 extending from the main body 1030c. In some embodiments, the upper housing 1031 can enable appropriate lid 1030 installation. In some embodiments, the upper housing 1031 can comprise one or more apertures facilitating access, observation, and/or air flow. For example, some embodiments include lid fluid slot 1032 extending across a portion of the upper housing 1031 towards the front end 101a. In some embodiments, the lid fluid slot 1032 can provide ease of access to the inner volume 102. Some further embodiments include a lid food slot 1033 extending across a portion of the upper housing 1031 towards the back end 101b and adjacent to the lid tab 1034. In some embodiments, the lid food slot 1033 can provide for access for feeding without the need to remove the lid 1030. In some embodiments, the apertures can vary in number and size and/or position on the upper housing 1031. Further, some embodiments can include one or more similar apertures or vents in other regions of the tank lid 1030.

In reference to FIG. 15B, and the above description related to the upper and lower notches 104a and extensions 104b positioned at the inner end of the front side wall 101e on an opposite side, and the ability for the upper and lower notches 104a and upper and lower extensions 104b being configured to secure, and/or retain the tank baffle 1040 in the tank housing 101h, in some embodiments, the tank baffle 1040 can include one or more structures that can couple with the upper and lower notches 104a and upper and lower extensions 104b. For example, FIG. 18B illustrates a close-up view of a baffle 1040 of the tank assembly 101 of FIG. 11 in accordance with some embodiments of the invention, and FIG. 18A illustrates an outward-facing perspective view of a baffle 1040 of the tank assembly 101 of FIG. 11 in accordance with some embodiments of the invention. Further, FIG. 18C illustrates an outward-facing perspective view of a baffle 1040 of the tank assembly 101 of FIG. 11 in accordance with some embodiments of the invention.

In some embodiments, the baffle 1040 can include structures to facilitate securing into the tank housing 101h. For example, in some embodiments of the invention, one side of the baffle 1040 can include at least one tab and the other side can include at least one receiver. For example, some embodiments include baffle springs 1041a on one side of the baffle 1040, and/or upper and lower receivers 1041b on an opposite side of the baffle 1040. In some embodiments, the baffle springs 1041a can ensure an optimal fit between the tank housing 101h and the baffle 1040, where surface 1044 (shown in FIG. 18B) can ensure an optimal seal between the baffle 1040 and the tank housing 101h. In some embodiments, when the baffle 1040 is at least partially positioned in the inner volume 102, the baffle springs 1041a can couple to or be positioned into upper and lower notches 104a, and/or at least one of the upper and lower extensions 104b of the tank housing 101h can be positioned into an upper and/or lower receiver 1041b of the baffle 1040. In some embodiments, the coupling of the baffle springs 1041a into the notches 104a and/or the coupling of the upper and lower extensions 104b into the upper and lower receivers 1041b can be a mechanical and/or a friction coupling. In some embodiments, at least one of the baffle springs 1041a and/or the upper and lower extensions 104b can flex, bend or move when being positioned into or out of the respective notches 104a and receivers 1041b. In some embodiments, the number and position of the notches 104a and/or extensions 104b, and/or baffle springs 1041a and/or receivers 1041b can vary beyond the non-limiting embodiments described herein. For example, some embodiments include more or fewer notches 104a and/or extensions 104b, and/or baffle springs 1041a and/or receivers 1041b than shown and described.

In some embodiments, the baffle 1040 can comprise a plurality of baffle overflow slots 1042 extending through the baffle overflow ramp 1046 at the top end 1046a, and a baffle locating ridge 1045 extending across the baffle overflow ramp 1046 from one side to an opposite side. In some embodiments, the baffle locating ridge 1045 can ensure an optimal fit between the tank housing 101h and the baffle 1040. In some embodiments, the baffle overflow slot 1042 can ensure optimal fluid drainage in case of any blockages in one or more fluid pathways. Further, in some embodiments, the baffle 1040 can include a baffle fluidway 1043 extending a least a partial length of the baffle 1040. In some embodiments, the baffle fluidway 1043 can extend from adjacent the baffle locating ridge 1045 towards the bottom end 1046b of the baffle overflow ramp 1046. Further, in some embodiments, the baffle fluidway 1043 can extend from adjacent the baffle locating ridge 1045 towards the bottom end 1046b of the baffle overflow ramp 1046, and can extend into a trough 1047 that extends from one side of the baffle 1040 to the opposite side of the baffle 1040. In some embodiments, the baffle fluidway 1043 can ensure optimal fluid guidance. Referring to the cross-sectional view of FIG. 20A and the partial perspective of FIG. 15B, in some embodiments, the baffle fluidway 43 can fluidly couple to outlet channel 105a coupled to a final fluid outlet 106 in the outlet section 101g via fluid outlet 105. In some embodiments, the final fluid outlet 106 can provide fluid outlet guidance.

Figure 19A:
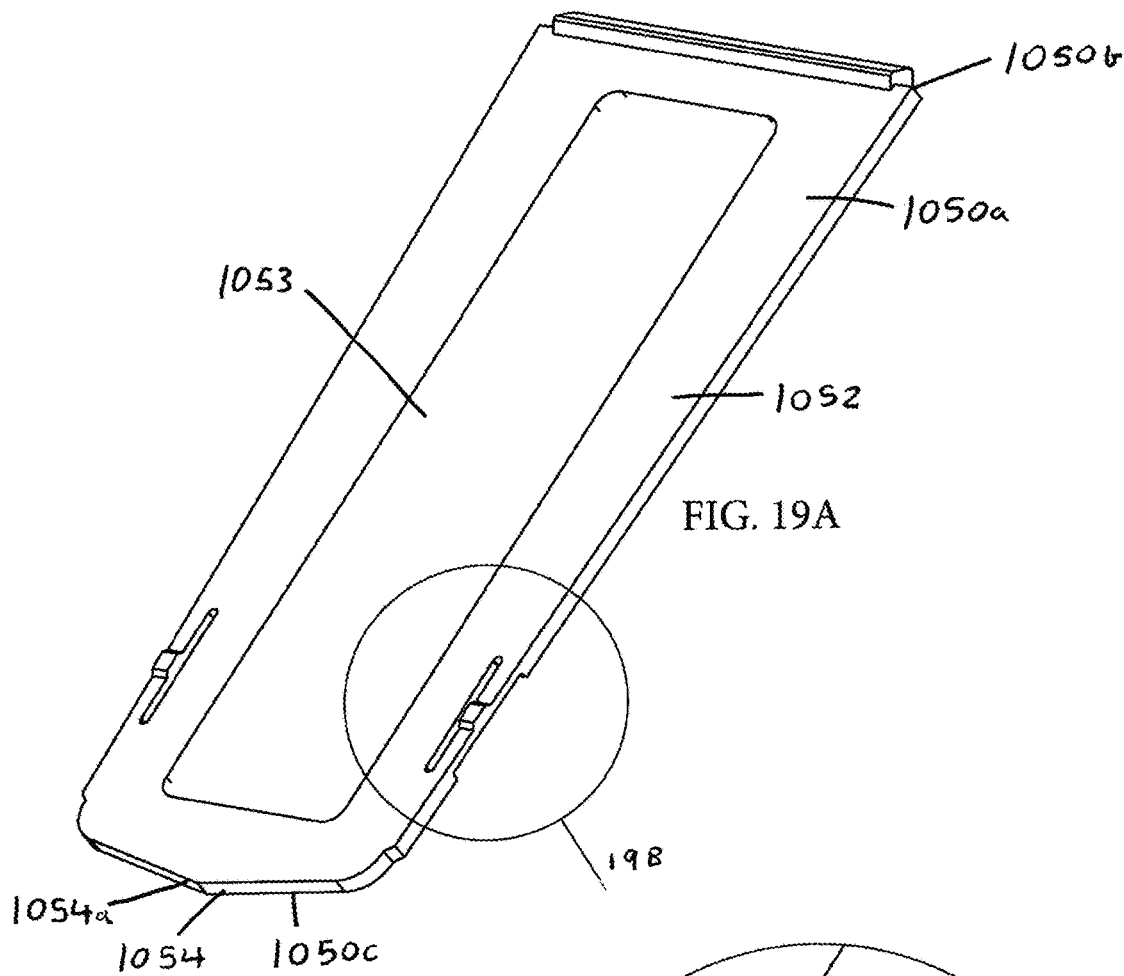
FIG. 19A illustrates a perspective view of a tank filter of the tank assembly of FIG. 11 in accordance with some further embodiments of the invention.
Figure 19B:
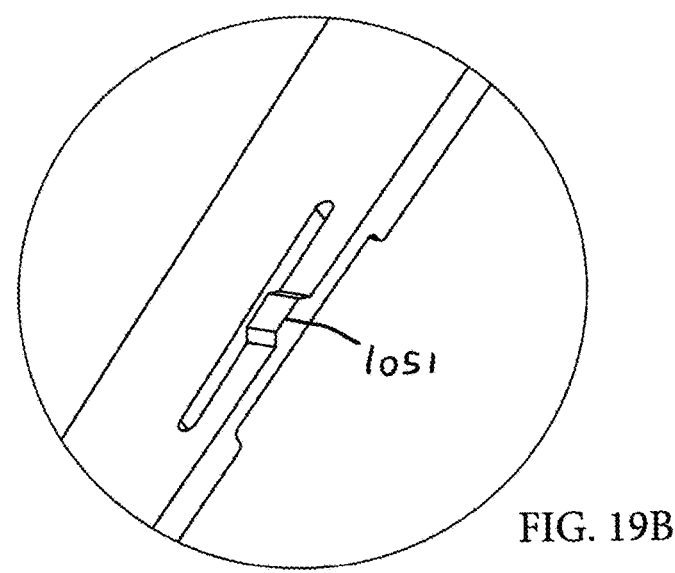
FIG. 19B illustrates a perspective view of an edge portion of the tank filter of the tank assembly of FIG. 19A in accordance with some further embodiments of the invention.

Some embodiments further include notches, tabs, extensions, or other conventional coupling means to secure one or more other structures of the tank assembly 101. For example, as discussed earlier, some embodiments include tank filter housing slots such as one or more channels or guides 1010 into which edges of the tank filters 1050 can be inserted, and some embodiments include one or more short ribs or extensions 1011 that can couple with an extension or tab of a tank filter 1050. For example, FIG. 19A illustrates a perspective view of a tank filter 1050 of the tank assembly 1 of FIG. 1 in accordance with some embodiments of the invention, and FIG. 19B illustrates a perspective view of an edge portion of the tank filter 1050 of the tank assembly 101 of FIG. 19A in accordance with some embodiments of the invention. In some embodiments, the tank filter 1050 can comprise a frame 1050a including a top end 1050b, and a bottom end 1050c, and side-edges 1052. In some embodiments, a filter, screen or mesh (element 1053) can be positioned in the frame 1050a and/or supported, fixed, and/or integrated with the filter, screen or mesh 1053 to provide at least some fluid filtration. In some embodiments, the bottom end 1050c can comprise two angled or inwardly sloped sides 1054. In some embodiments, the angled or inwardly sloped sides 1054 are shaped to complement the bottom surfaces 102d of the tank housing 101h (see for example FIG. 15A where the centerline 102e corresponds to lowest point of the inner volume 102 that is configured to couple with the apex 1054a of the tank filter 1050, and thus bottom surfaces 102d can comprise a sloped bottom of the tank assembly 101). In some embodiments, the filter, screen or mesh 1053 can enable fluid flow between the main volume 102a and the filtered volume 102b and/or the outlet volume. In some embodiments, the sloped bottom surfaces 102d can provide improved debris guidance. In some embodiments, the filter, screen or mesh 1053 can prevent transfer of suspended material and/or aquatic animals between the main volume 102a and the filtered volume 102b and/or the outlet volume.

Figure 19C:
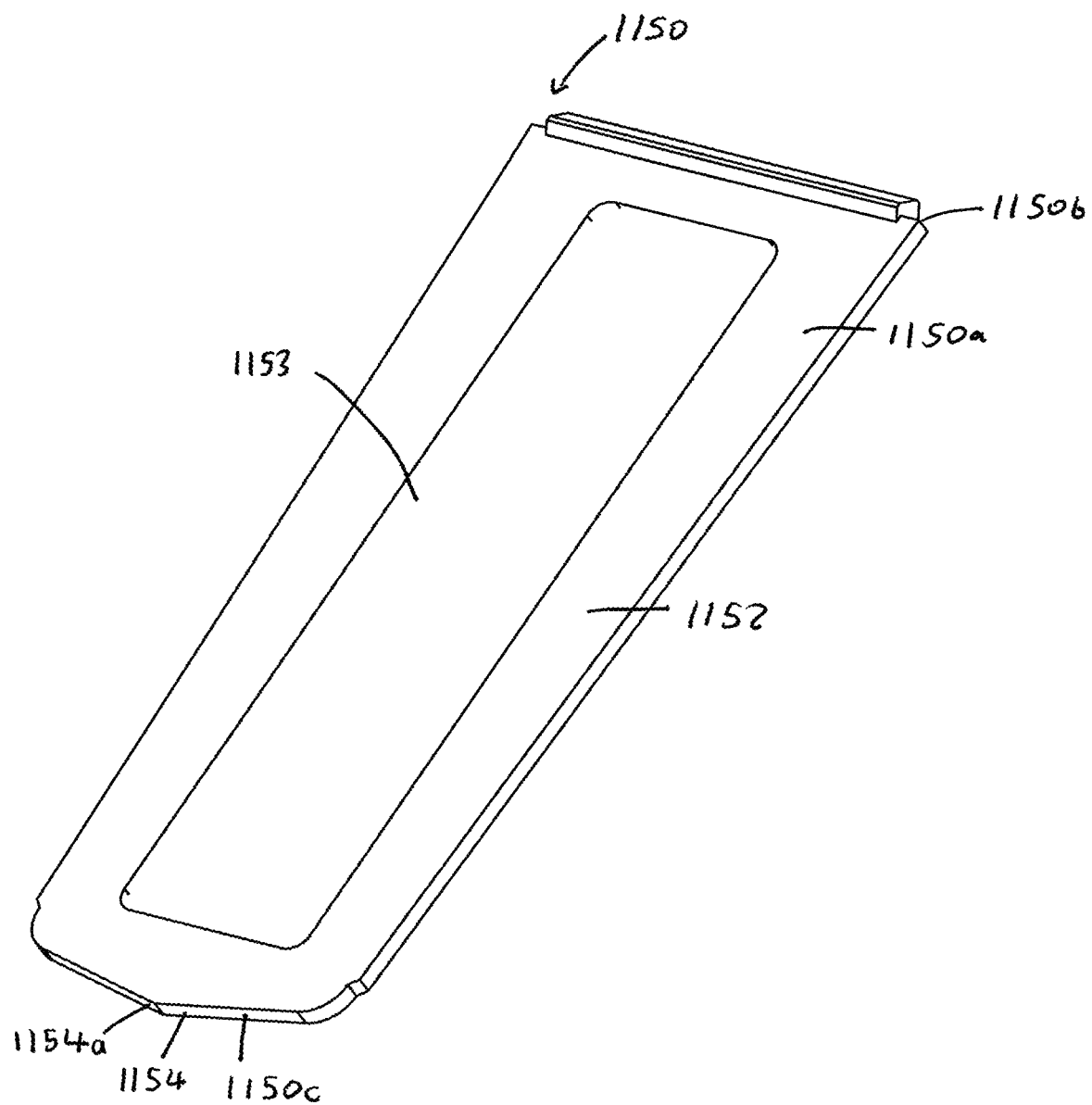
FIG. 19C illustrates a perspective view of a tank filter in accordance with some further embodiments of the invention.

In some embodiments, the tank filter 1050 can include at least one filter spring 1051 positioned on an edge or side or side-edge 1052 of the tank filter 1050. In some embodiments, the filter spring 1051 can provide at least a partial seal with the tank housing 101h. For example, some embodiments include at least one filter spring 1051 positioned on one side-edge 1052 of the tank filter 1050. In some embodiments, during insertion of the tank filter 1050 into the inner volume 102, at least one filter spring 1051 can couple and/or slide over an extension 1011 of the tank housing 101h. In some embodiments, the coupling of one or more filter tabs 1051 with the extension 1011 can be a mechanical and/or a friction coupling. In some embodiments, at least one filter spring 1051 and/or extension 1011 can flex, bend or move when the filter 1050 is being inserted or removed from the inner volume 102 of the tank housing 101h. The number and position of the filter tabs 1051 and/or extensions 1011 can vary beyond the non-limiting embodiments described herein. For example, some embodiments include more or less filter tabs 1051 and/or extensions 1011. In other embodiments of the invention, the tank filter can does not include a filter spring 1051. For example, FIG. 19C shows a tank filter 1150 comprising a frame 1150a including a top end 1150b, and a bottom end 1150c, and side-edges 1152. In some embodiments, a filter, screen or mesh (element 1153) can be positioned in the frame 1150a and/or supported, fixed, and/or integrated with the filter, screen or mesh 1153 to provide at least some fluid filtration. In some embodiments, the bottom end 1150c can comprise two angled or inwardly sloped sides 1154. In some embodiments, the angled or inwardly sloped sides 1154 are shaped to complement the bottom surfaces 102d of the tank housing 101h. In some embodiments, the filter, screen or mesh 1153 can enable fluid flow between the main volume 102a and the filtered volume 102b and/or the outlet volume. In some embodiments, the filter, screen or mesh 1153 can prevent transfer of suspended material and/or aquatic animals between the main volume 102a and the filtered volume 102b and/or the outlet volume.

Figure 20B:
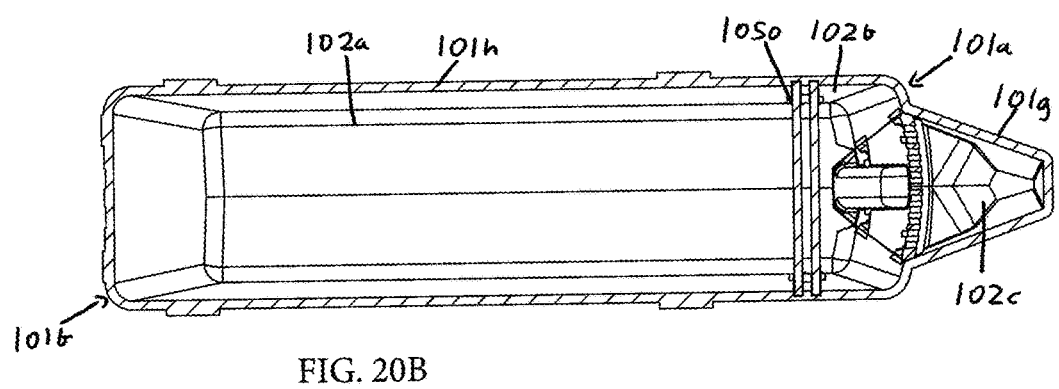
FIG. 20B illustrates a top cross-sectional view of the tank assembly of FIG. 11 in accordance with some further embodiments of the invention.

The overall architecture, shape and volume proportions of the inner volume 102 can be further understood from FIG. 20A, illustrating a side cross-sectional view of the tank assembly 101 of FIG. 11 in accordance with some embodiments of the invention, and FIG. 20B illustrating a top cross-sectional view of the tank assembly 101 of FIG. 11 in accordance with some embodiments of the invention. In some embodiments, the outlet section 101g of the tank housing 101h that includes outlet volume 102c can extend up to about one half of the height of the tank housing 101h as shown. In other embodiments, the outlet section 101g of the tank housing 101h that includes outlet volume 102c can extend less than half the height of the tank housing 101h or more than the height of the tank housing 101h. In some embodiments, the main volume 102a, and/or the filtered volume 102b can change based on the position of one or more tank filters 1050.

Figure 21:
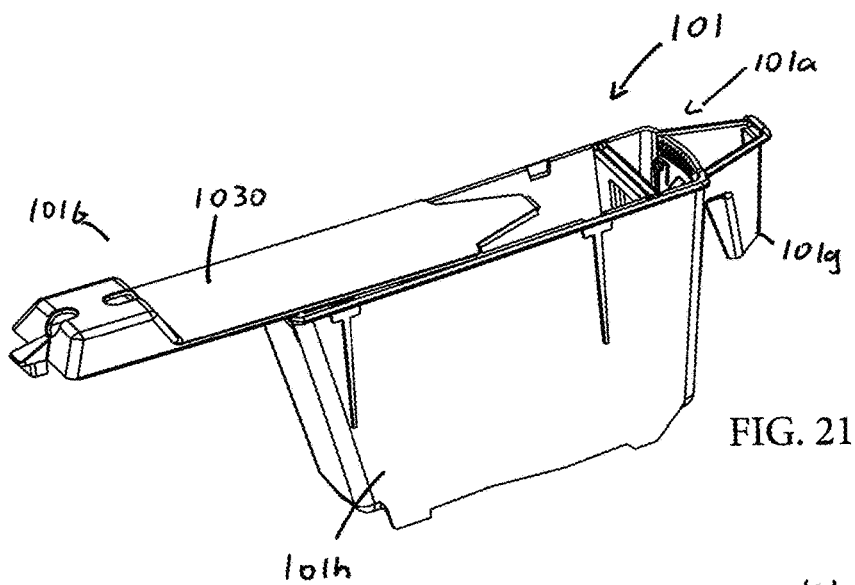
FIG. 21 illustrates a tank assembly with a partially open lid in accordance with some further embodiments of the invention.
Figure 22:
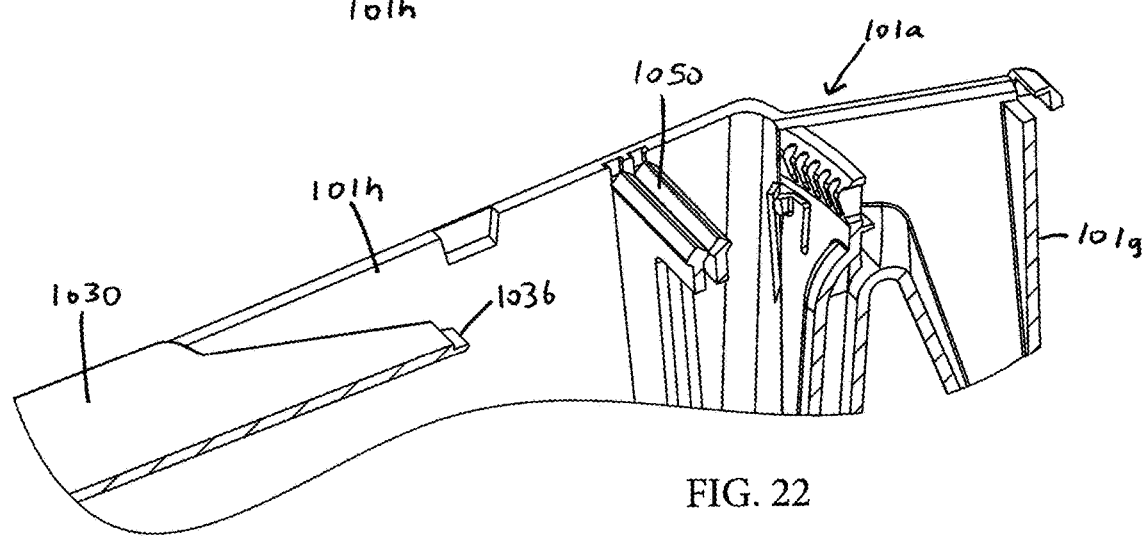
FIG. 22 illustrates a close-up view of a portion of a tank housing in accordance with some further embodiments of the invention.
Figure 23:
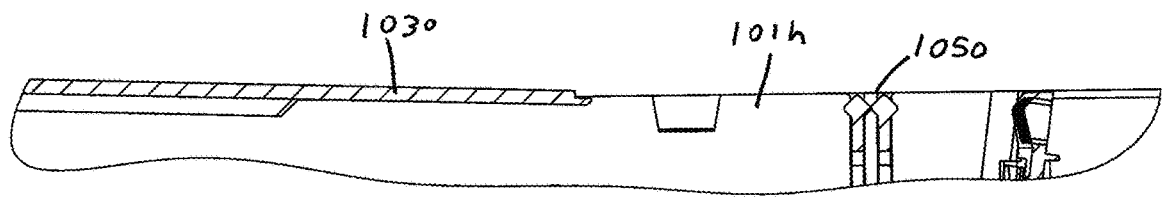
FIG. 23 illustrates a side cross-sectional view of a portion of a tank housing in accordance with some further embodiments of the invention.
Figure 24:
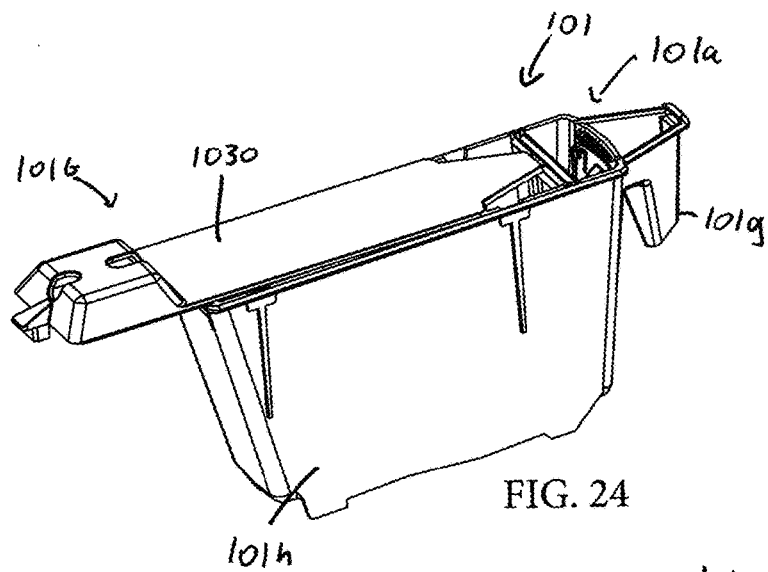
FIG. 24 illustrates a tank assembly with a partially open lid in accordance with some further embodiments of the invention.
Figure 25:
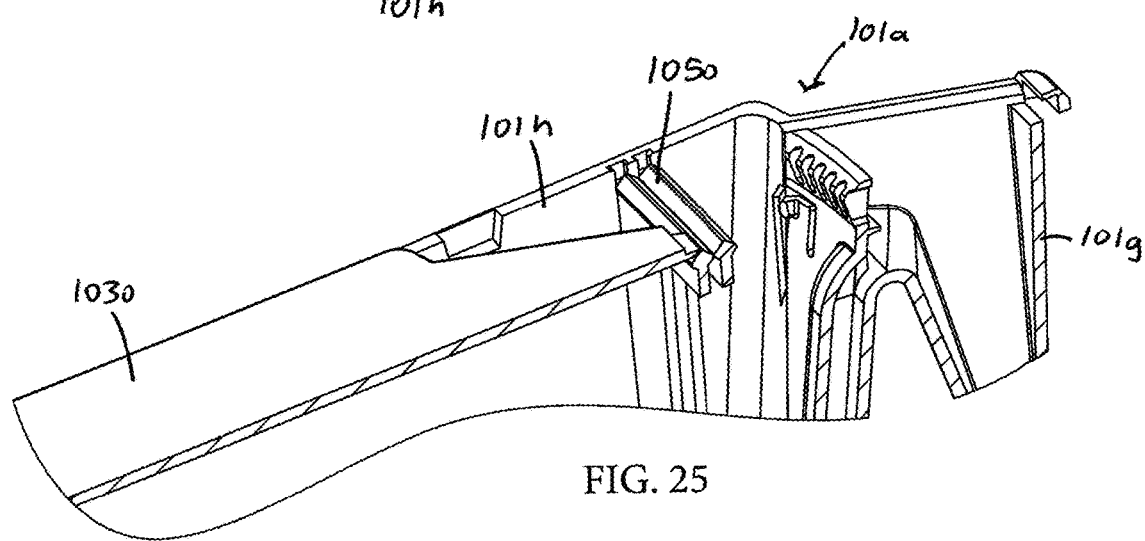
FIG. 25 illustrates a close-up view of a portion of a tank housing in accordance with some further embodiments of the invention.
Figure 26:
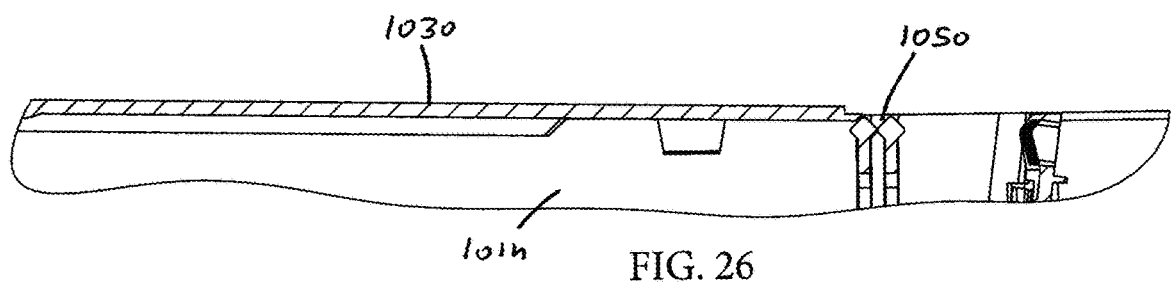
FIG. 26 illustrates a side cross-sectional view of a portion of a tank housing in accordance with some further embodiments of the invention.

As described earlier, in some embodiments of the invention, the tank lid 1030 can be slid from the tank housing 101h. FIGS. 31-38 are intended to illustrate the assembly or disassemble of the tank assembly 101 where the tank lid 1030 is slid onto or off the tank housing 101h. For example, FIG. 21 illustrates a tank assembly 101 with a partially open lid 1030 in accordance with some further embodiments of the invention, and FIG. 22 illustrates a close-up view of a portion of a tank housing 101h in accordance with some further embodiments of the invention. Further, FIG. 23 illustrates a side cross-sectional view of a portion of a tank housing 101h in accordance with some further embodiments of the invention. Further, FIG. 24 illustrates a tank assembly 101 with a partially open lid 1030 in accordance with some further embodiments of the invention, and FIG. 25 illustrates a close-up view of a portion of a tank housing 101h in accordance with some further embodiments of the invention. Further, FIG. 26 illustrates a side cross-sectional view of a portion of a tank housing 101h in accordance with some further embodiments of the invention.

Figure 27:
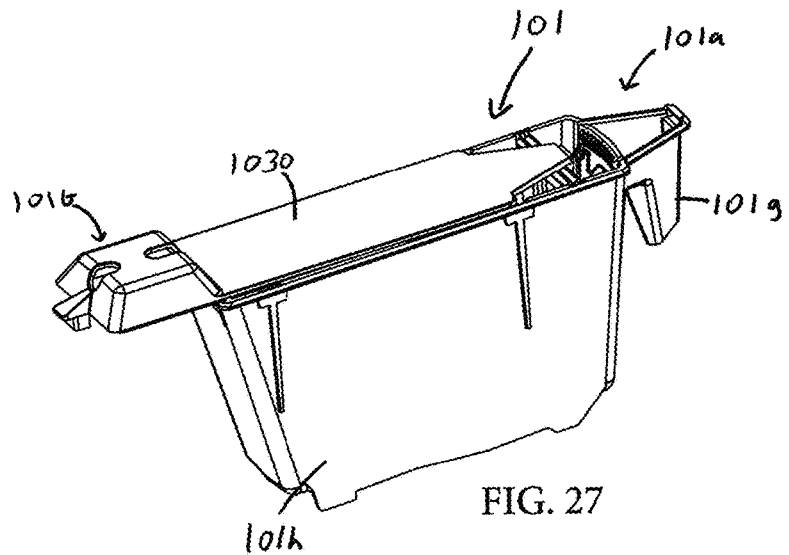
FIG. 27 illustrates a tank assembly with a partially open lid in accordance with some further embodiments of the invention.
Figure 28:
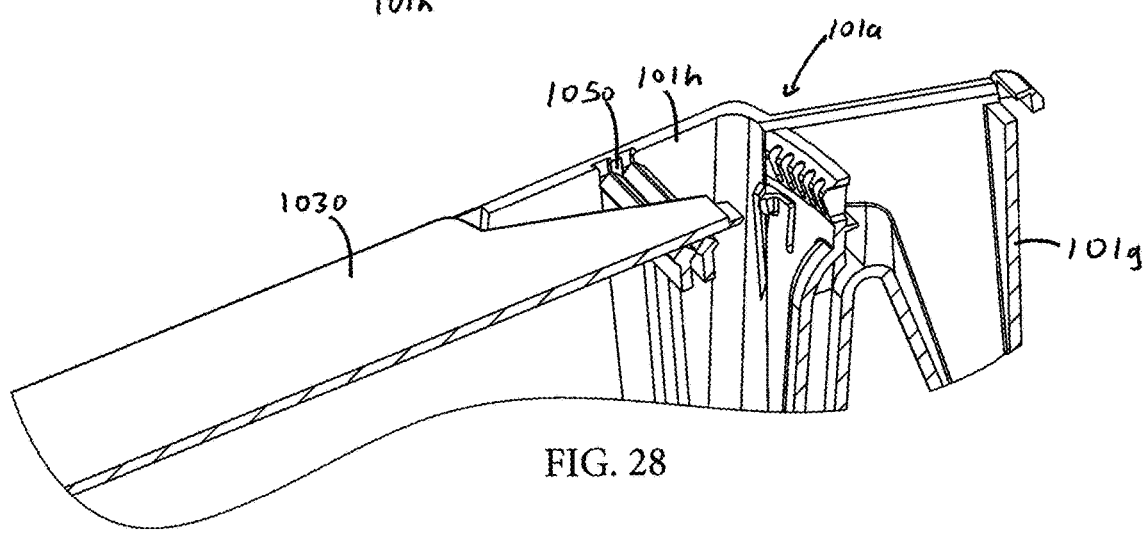
FIG. 28 illustrates a close-up view of a portion of a tank housing in accordance with some further embodiments of the invention.
Figure 29:
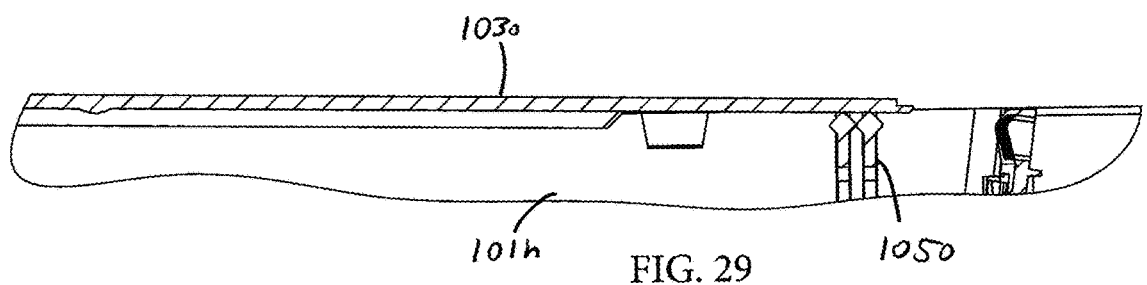
FIG. 29 illustrates a side cross-sectional view of a portion of a tank housing in accordance with some further embodiments of the invention.
Figure 30:
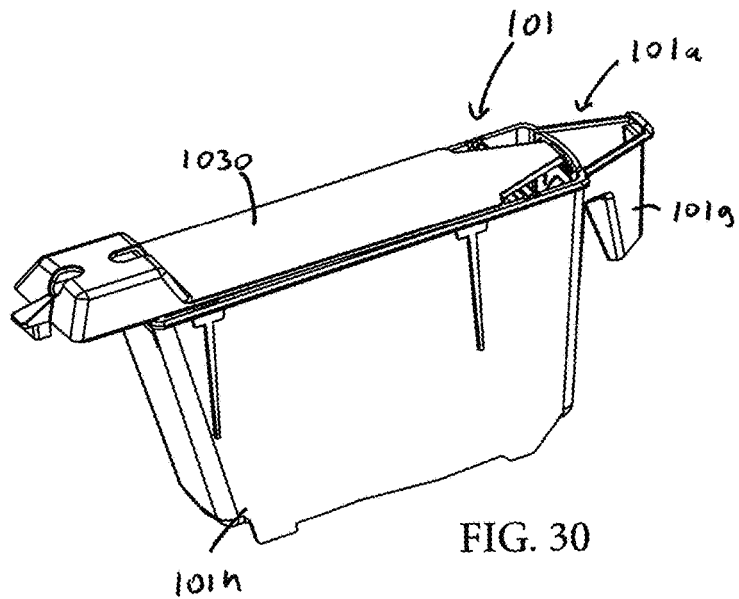
FIG. 30 illustrates a tank assembly with a partially open lid in accordance with some further embodiments of the invention.
Figure 31:
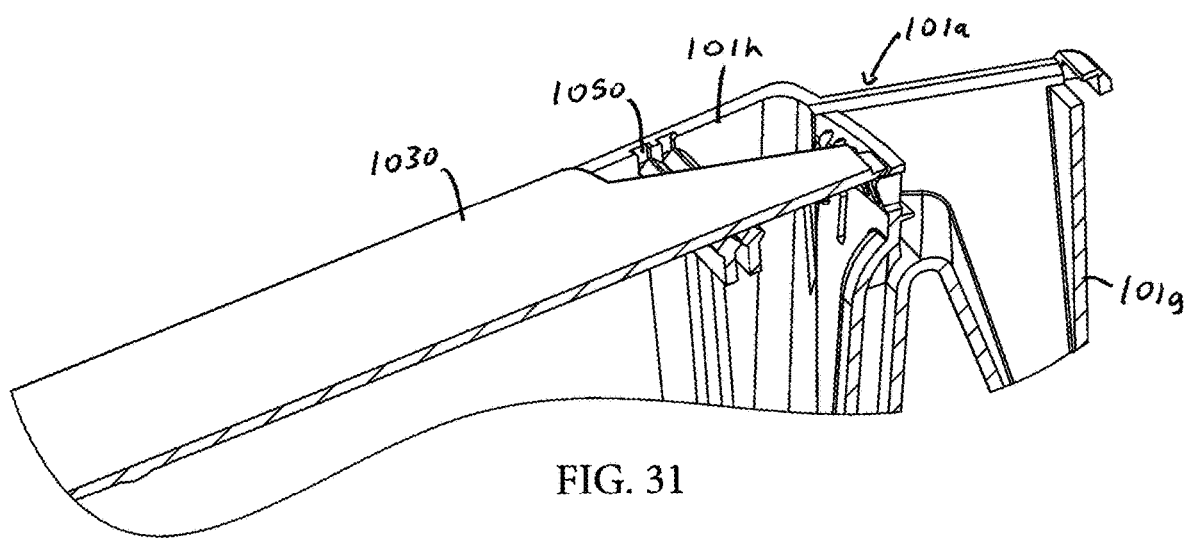
FIG. 31 illustrates a close-up view of a portion of a tank housing in accordance with some further embodiments of the invention.
Figure 32:
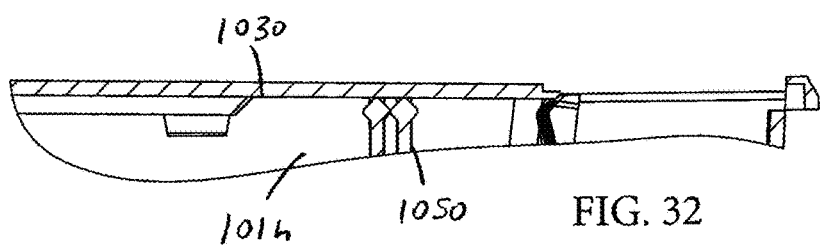
FIG. 32 illustrates a side cross-sectional view of a portion of a tank housing in accordance with some further embodiments of the invention.
Figure 33:
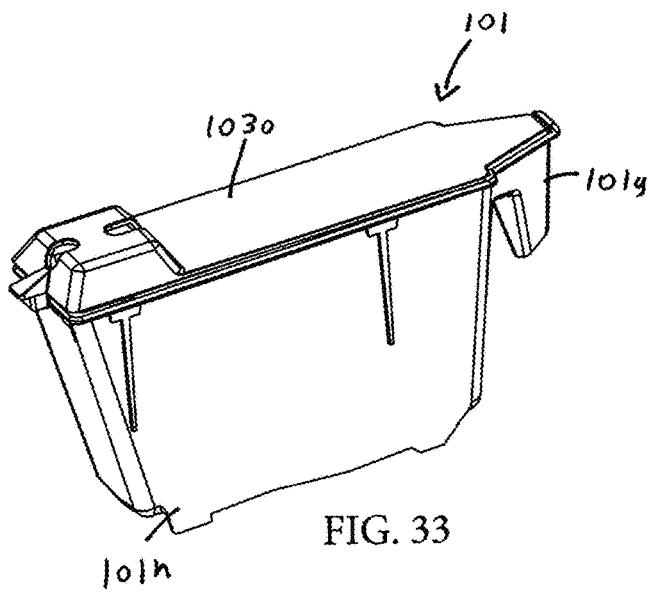
FIG. 33 illustrates a tank assembly in accordance with some further embodiments of the invention.
Figure 34:
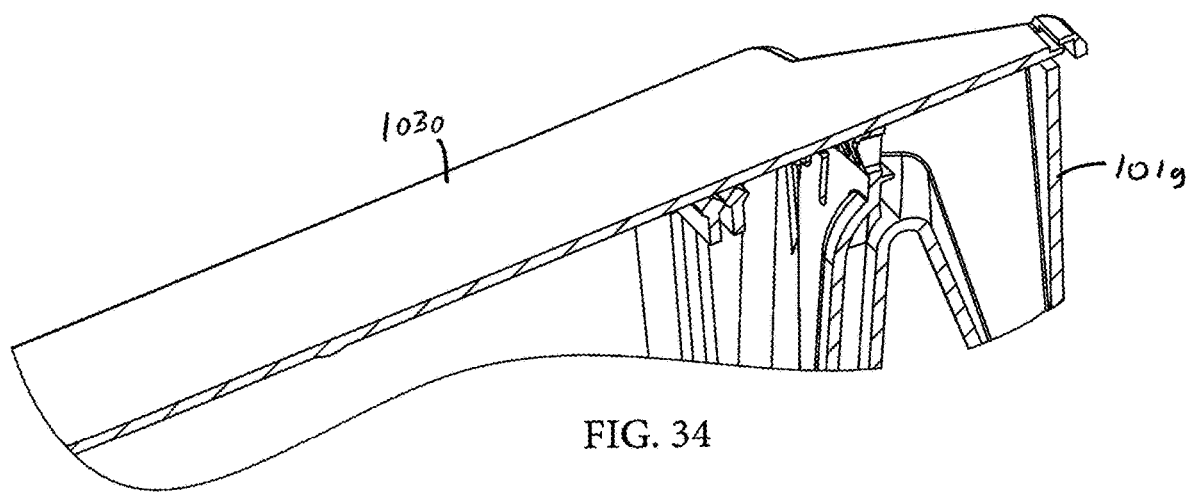
FIG. 34 illustrates a close-up view of a portion of a tank housing in accordance with some further embodiments of the invention.
Figure 35:
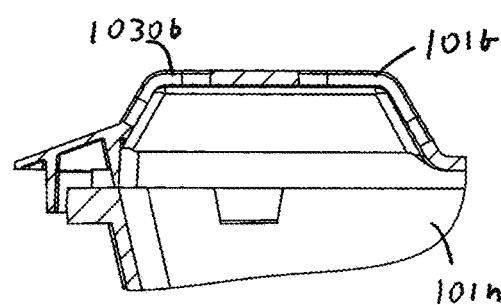
FIG. 35 illustrates a cross-sectional view of a portion of a tank housing in accordance with some further embodiments of the invention.
Figure 36:
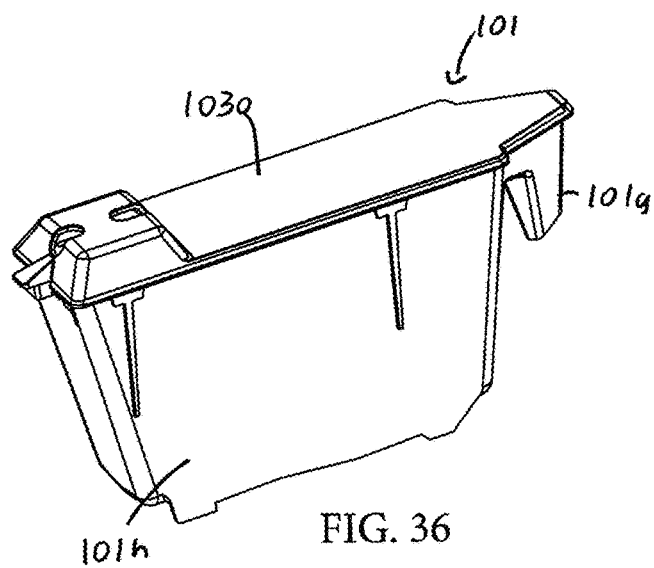
FIG. 36 illustrates a tank assembly in accordance with some further embodiments of the invention.
Figure 37:
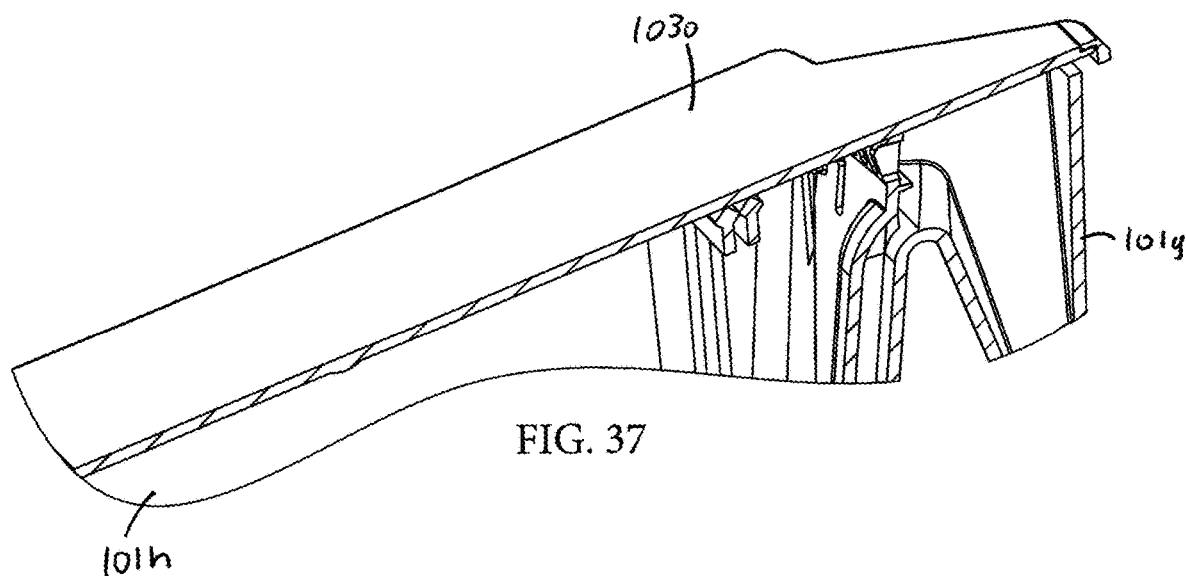
FIG. 37 illustrates a close-up view of a portion of a tank housing in accordance with some further embodiments of the invention.
Figure 38:
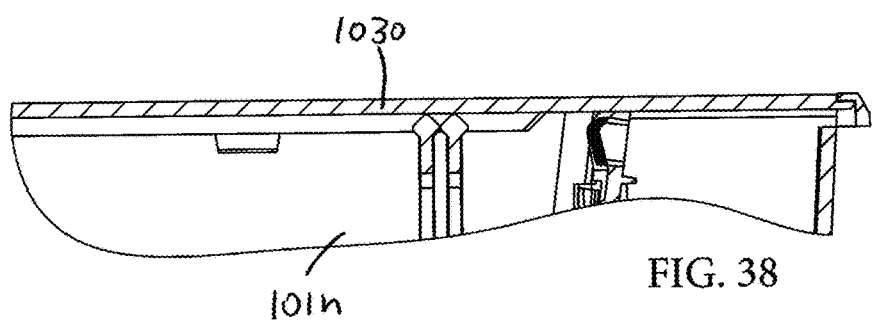
FIG. 38 illustrates a cross-sectional view of a portion of a tank housing in accordance with some further embodiments of the invention.

FIG. 27 illustrates a tank assembly 101 with a partially open lid 1030 in accordance with some further embodiments of the invention, and FIG. 28 illustrates a close-up view of a portion of a tank housing 101h in accordance with some further embodiments of the invention. Further, FIG. 29 illustrates a side cross-sectional view of a portion of a tank housing 101h in accordance with some further embodiments of the invention. FIG. 30 illustrates a tank assembly 101 with a partially open lid 1030 in accordance with some further embodiments of the invention, and FIG. 31 illustrates a close-up view of a portion of a tank housing 101h in accordance with some further embodiments of the invention. Further, FIG. 32 illustrates a side cross-sectional view of a portion of a tank housing 101h in accordance with some further embodiments of the invention. FIG. 33 illustrates a tank assembly 101 in accordance with some further embodiments of the invention, and FIG. 34 illustrates a close-up view of a portion of a tank housing 101h in accordance with some further embodiments of the invention. Further, FIG. 35 illustrates a cross-sectional view of a portion of a tank housing 101h in accordance with some further embodiments of the invention. FIG. 36 illustrates a tank assembly 101 in accordance with some further embodiments of the invention, and FIG. 37 illustrates a close-up view of a portion of a tank housing 101h in accordance with some further embodiments of the invention. Further, FIG. 38 illustrates a cross-sectional view of a portion of a tank housing 101h in accordance with some further embodiments of the invention.

FIG. 39A illustrates a cross-sectional view of a portion of a tank assembly 101 in accordance with some further embodiments of the invention, and represents the insertion and locking of the tank lid 1030 with the outlet portion 1030d. Close-up area 39b is shown as FIG. 39B illustrating a close-up cross-sectional view of a portion of a tank assembly 101 in accordance with some further embodiments of the invention, and shows the locking tongue 1036 of the tank lid 1030 inserted with the joint 1018b formed between the tank locking tongue 1036 and the tank lid stop surface 1018. In reference again to FIG. 17E showing the lid locking tongue 1036 extending from the front end 1030a, end surface 1036c, and edge 1036d, the joint 1018b is formed with the edge 1036d and the tank lid stop surface 1018, and the end surface 1036c interfaces with the tank lid stop surface 1018. Further, FIG. 40 illustrates a perspective view of a tank assembly 101 including a raised lid 1030 in accordance with some further embodiments of the invention, and shows the locking tongue 1036 of the tank lid 1030 inserted with the joint 1018b formed between the tank locking tongue 1036 and the tank lid stop surface 1018 as represented in FIG. 39B.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims

The invention claimed is:
1. A tank assembly consisting of:
   a main housing enclosing a portion of an inner volume;
   an outlet section positioned extending from or adjacent one end of the main housing, the outlet section including a front cavity comprising an outlet volume and an adjacent outlet channel;
   a removable tank baffle positioned in the main housing adjacent to the outlet section, the removable tank baffle including at least one channel and a plurality of baffle apertures, wherein the at least one channel is configured to be fluidly coupled to the outlet channel, and wherein the plurality of baffle apertures are configured to be fluidly coupled to the outlet volume;

at least one removable filter configured to be inserted at least partially into the main housing forming at least a filtered volume and a fluidly coupled main volume; and a removable tank lid comprising a main body including a front end and a back end, wherein the tank lid includes a coupler at the back end that is configured and arranged to secure within tabs located on an upper edge of a rear side wall of the main housing which enables opening, closing and pivoting of the tank lid, and also acts as the mechanism for removing the tank lid.

2. The tank assembly of claim 1, wherein the tank lid comprises an outlet portion extending from the main body at the front end, and an upper housing extending from the main body at the back end.

3. The tank assembly of claim 2, wherein the tank lid includes a forward vent extending across a portion of the upper housing towards the front end.

4. The tank assembly of claim 2, wherein the tank lid includes a rearward vent extending across a portion of the upper housing towards the back end.

5. The tank assembly of claim 1, wherein the tank lid includes an inner skirt extending at least partially around the main body, the inner skirt being at least partially within the inner volume when the tank lid is coupled to the main housing.

6. The tank assembly of claim 1, wherein the main housing includes at least one guide, wherein the at least one removable filter is configured to be inserted into the at least one guide.

7. The tank assembly of claim 1, wherein the main housing includes one or more notches positioned at an inner end of a front side wall on one side.

8. The tank assembly of claim 7, wherein the main housing includes one or more extensions positioned at the inner end of the front side wall on an opposite side, wherein the one or more notches, and the one or more extensions are configured to couple, secure, and/or at least partially retain the tank baffle.

9. The tank assembly of claim 1, wherein the outlet section comprises a front wall including a slot.

10. The tank assembly of claim 9, wherein the slot is fluidly coupled to the outlet volume.

11. The tank assembly of claim 10, wherein the at least one channel is configured to fluidly couple to the outlet channel via the slot when the tank baffle is positioned in the main housing.

12. A good consisting essentially of:

a tank housing enclosing an inner volume, the tank housing including a front end comprising an outlet section including an outlet volume and outlet channel;

a single tank baffle including at least one central channel, the tank baffle being configured to be inserted into the tank housing adjacent to the outlet section;

at least one removable filter configured to be inserted at least partially into guides of the tank housing; and a removable tank lid comprising a main body including a front end and a back end, wherein the tank lid includes a coupler at the back end that is configured and arranged to secure within tabs located on an upper edge of a rear side wall of the main housing which enables opening, closing and rotation pivoting of the tank lid, and also acts as the mechanism for removing the tank lid.

13. The good of claim 12, wherein the at least one central channel is configured and arranged to be fluidly coupled to the outlet channel of the outlet section when the tank baffle is positioned in the tank housing.

14. The good of claim 13, wherein the fluid coupling is achieved via a slot in a front wall of the outlet section.

15. The good of claim 12, wherein the main body further includes an outlet portion extending from the main body at the front end.

16. The good of claim 15, wherein the tank lid includes an upper housing extending from the main body at a back end of the tank lid opposite the front end.

17. The good of claim 13, wherein the tank baffle includes at least one tab on one side.

18. The good of claim 17, wherein the tank housing includes one or more notches positioned at an inner end of a front side wall on one side and one or more extensions positioned at the inner end of the front side wall on an opposite side, wherein the one or more notches, and the one or more extensions are configured to couple, secure, and/or at least partially retain the tank baffle, and wherein when the tank baffle is at least partially positioned in the tank housing, the at least one of the tab is configured and arranged to couple to or be positioned into at least one of the notches, and/or at least one of the extensions of the tank housing can be positioned into at least one receiver of the tank baffle.

19. The good of claim 17, wherein an opposite side of the tank baffle to the side of the tank baffle with the at least one tab, includes at least one receiver.

* * * * *